(12) United States Patent
Zheng

(10) Patent No.: US 11,697,986 B2
(45) Date of Patent: Jul. 11, 2023

(54) POWER MANAGEMENT AT A WELLSITE

(71) Applicant: Schlumberger Technology Corporation, Sugar Land, TX (US)

(72) Inventor: Shunfeng Zheng, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/012,417

(22) Filed: Sep. 4, 2020

(65) Prior Publication Data
US 2022/0074297 A1    Mar. 10, 2022

(51) Int. Cl.
*E21B 44/00* (2006.01)
*H02J 13/00* (2006.01)

(52) U.S. Cl.
CPC ........ *E21B 44/00* (2013.01); *H02J 13/00001* (2020.01); *H02J 13/00002* (2020.01)

(58) Field of Classification Search
CPC ............... E21B 44/00; H02J 13/00001; H02J 13/00002
See application file for complete search history.

(56) References Cited

U.S. PATENT DOCUMENTS

| | | |
|---|---|---|
| 4,483,362 A | 11/1984 | Luginbuhl |
| 4,593,763 A | 6/1986 | Burke |
| 6,639,331 B2 | 10/2003 | Schultz |
| 8,118,012 B2 | 2/2012 | Suzuki et al. |
| 8,186,315 B2 | 5/2012 | Jeffs et al. |

(Continued)

FOREIGN PATENT DOCUMENTS

| | | |
|---|---|---|
| JP | 2003286901 A | 10/2003 |
| WO | 2018201118 A1 | 11/2018 |

(Continued)

OTHER PUBLICATIONS

Pavkovic et al., "Oil drilling rig diesel power-plant fuel efficiency improvement potentials through rule-based generator scheduling and utilization of battery energy storage system", Energy Conversion and Management, vol. 121, 2016, pp. 194-211.

(Continued)

*Primary Examiner* — Rexford N Barnie
*Assistant Examiner* — Thai H Tran
(74) *Attorney, Agent, or Firm* — Jeffrey D. Frantz

(57) ABSTRACT

Apparatus and methods for managing power at a wellsite. An example apparatus may include a well construction equipment operable to construct a well at the wellsite, a power supply system operable to output electrical power to the well construction equipment to facilitate operation of the well construction equipment, and a control system for controlling the well construction system. The control system may be operable to store a digital drilling program and cause the well construction equipment to perform planned well construction operations based on the digital drilling program. The digital drilling program may include an equipment operational plan indicative of the planned well construction operations to be performed by the well construction equipment to construct the well, and an electrical power plan indicative of a planned electrical power demand of the well construction equipment to perform the planned well construction operations.

18 Claims, 6 Drawing Sheets

(56) References Cited

U.S. PATENT DOCUMENTS

| | | |
|---|---|---|
| 8,237,300 B2 | 8/2012 | Allen |
| 8,373,949 B2 | 2/2013 | Bourgeau |
| 8,519,565 B2 | 8/2013 | Dozier et al. |
| 8,604,639 B2 | 12/2013 | Hopwood |
| 8,975,767 B2 | 3/2015 | Algrain |
| 8,987,939 B2 | 3/2015 | Yu et al. |
| 9,042,141 B2 | 5/2015 | Yu et al. |
| 9,059,587 B2 | 6/2015 | Williams |
| 9,065,300 B2 | 6/2015 | Williams |
| 9,197,071 B2 | 11/2015 | Williams |
| 9,240,687 B2 | 1/2016 | Carralero et al. |
| 9,267,428 B2 | 2/2016 | Jonson et al. |
| 9,444,252 B2 | 9/2016 | Bourgeau |
| 9,644,431 B2 | 5/2017 | Myers et al. |
| 9,803,461 B2 | 10/2017 | Boone |
| 9,806,530 B2 | 10/2017 | Martinez |
| 10,017,993 B2 | 7/2018 | Hu et al. |
| 10,018,044 B2 | 7/2018 | Hu et al. |
| 10,151,178 B2 | 12/2018 | Stephenson et al. |
| 10,243,371 B2 | 3/2019 | Gerdes et al. |
| 10,253,685 B2 | 4/2019 | Alexander et al. |
| 10,283,966 B2 | 5/2019 | Macdonald |
| 10,309,166 B2 | 6/2019 | Thiemann et al. |
| 10,337,424 B2 | 7/2019 | Janik |
| 10,389,113 B2 | 8/2019 | Bourgeau |
| 10,390,466 B2 | 8/2019 | Held et al. |
| 10,472,953 B2 | 11/2019 | Orban |
| 10,491,004 B2 | 11/2019 | Gerdes et al. |
| 10,494,992 B2 | 12/2019 | Johnson et al. |
| 10,494,993 B2 | 12/2019 | Alexander et al. |
| 10,530,290 B2 | 1/2020 | Janik |
| 10,597,996 B2 | 3/2020 | Boone |
| 10,605,162 B2 | 3/2020 | Johnson et al. |
| 10,620,652 B2 | 4/2020 | Kubota et al. |
| 10,649,427 B2 | 5/2020 | Krippner et al. |
| 10,655,292 B2 | 5/2020 | Orban |
| 10,662,709 B2 | 5/2020 | Orban |
| 10,673,238 B2 | 6/2020 | Boone et al. |
| 10,697,275 B2 | 6/2020 | Krippner et al. |
| 10,699,822 B2 | 6/2020 | Orban et al. |
| 10,724,306 B2 | 7/2020 | Myers et al. |
| 10,724,341 B2 | 7/2020 | Krippner et al. |
| 10,731,426 B2 | 8/2020 | Brandsvoll et al. |
| 10,745,975 B2 | 8/2020 | Orban et al. |
| 10,760,348 B2 | 9/2020 | Krippner et al. |
| 10,797,510 B2 | 10/2020 | Foo et al. |
| 10,813,256 B2 | 10/2020 | Held et al. |
| 10,830,161 B2 | 11/2020 | Monros |
| 10,830,162 B2 | 11/2020 | Monros |
| 10,883,419 B2 | 1/2021 | Alexander et al. |
| 10,920,562 B2 | 2/2021 | Janakiraman et al. |
| 11,268,350 B2 | 3/2022 | Garcia |
| 2003/0015351 A1* | 1/2003 | Goldman ............ E21B 49/003 |
| | | 175/39 |
| 2009/0195074 A1 | 8/2009 | Buiel |
| 2009/0312885 A1* | 12/2009 | Buiel ................ H02J 3/38 |
| | | 700/297 |
| 2010/0070099 A1* | 3/2010 | Watson .............. F25D 21/04 |
| | | 700/295 |
| 2013/0234515 A1 | 9/2013 | Boone |
| 2015/0233213 A1 | 8/2015 | Hu et al. |
| 2016/0145974 A1 | 5/2016 | Tahoun |
| 2017/0229869 A1 | 8/2017 | Boone et al. |
| 2017/0234250 A1 | 8/2017 | Janik |
| 2019/0115758 A1 | 4/2019 | Orban et al. |
| 2019/0131905 A1 | 5/2019 | Janakiraman et al. |
| 2019/0229534 A1 | 7/2019 | Macdonald |
| 2019/0267805 A1 | 8/2019 | Kothuru et al. |
| 2020/0185915 A1 | 6/2020 | Bourgeau |
| 2020/0270948 A1 | 8/2020 | Kothuru et al. |
| 2020/0355032 A1 | 11/2020 | Myers et al. |
| 2020/0371484 A1 | 11/2020 | Madhireddy |
| 2020/0392814 A1 | 12/2020 | Krippner et al. |
| 2021/0083461 A1 | 3/2021 | Orban et al. |
| 2021/0115762 A1 | 4/2021 | Garcia et al. |

FOREIGN PATENT DOCUMENTS

| | | |
|---|---|---|
| WO | 2018213925 A1 | 11/2018 |
| WO | 2019084530 A1 | 5/2019 |
| WO | 2019118352 A1 | 6/2019 |
| WO | 2019232515 A1 | 12/2019 |
| WO | 2022051444 A1 | 3/2022 |

OTHER PUBLICATIONS

Bilgin et al., "World's First Hybrid Drilling Rig", IADC/SPE 199573-MS, IADC/SPE International Drilling Conference and Exhibition, 2020, 19 pages.

International Search Report and Written Opinion issued in International Patent Application No. PCT/US2021/025153 dated Jul. 9, 2021; 12 pages.

International Search Report and Written Opinion issued in International Patent Application No. PCT/US2021/048780 dated Dec. 1, 2021, 12 pages.

* cited by examiner

POWER MANAGEMENT AT A WELLSITE

BACKGROUND OF THE DISCLOSURE

Wells are generally drilled into the ground or ocean bed to recover natural deposits of oil, gas, and other materials that are trapped in subterranean rock formations. Well construction (e.g., drilling) operations may be performed at a wellsite by a well construction system (i.e., a drilling rig) having various surface and subterranean well construction equipment operating in a coordinated manner. For example, a drive mechanism, such as a top drive located at a wellsite surface, can be utilized to rotate and advance a drill string into a subterranean rock formation to drill a wellbore. The drill string may include a plurality of drill pipes coupled together and terminating with a drill bit. Length of the drill string may be increased by adding additional drill pipes while depth of the wellbore increases. Drilling fluid may be pumped from the wellsite surface down through the drill string to the drill bit. The drilling fluid lubricates and cools the drill bit, and carries drill cuttings from the wellbore back to the wellsite surface. The drilling fluid returning to the surface may then be cleaned and again pumped through the drill string. The well construction equipment of the well construction system may be grouped into various subsystems, wherein each subsystem performs a different operation.

Combustion engine electric generator units are typically utilized to output electrical power to operate the well construction equipment. Fuel efficiency of such generator units increases when load on the engine increases. Efficiency of the generator units (e.g., diesel fuel generating units) may be optimal at engine loads ranging between, for example, about 50% and about 100%. Efficiency of the generator units is also relatively low during engine warm up periods, which may take several minutes.

During well construction operations, electrical power demand changes frequently and substantially during different stages of the well construction operations. During such well construction operations, the generator units collectively output electrical power to match electrical power demand of the well construction equipment, regardless of efficiency. Thus, during stages of well construction operations requiring relatively low levels of electrical power, the generator units operate at low efficiencies and discharge gas and particulate emissions at higher rates. During stages of well construction operations requiring relatively high levels of electrical power, one or more additional generator units may be turned on to provide additional electrical power. However, the additional generator units are typically brought online very quickly, without permitting the additional generator units to properly warm up, resulting in the generator units operating at low efficiencies and discharging gas and particulate emissions at higher rates.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a well construction system having well construction equipment operable to construct a well at a wellsite, a power supply system operable to output electrical power to the well construction equipment to facilitate operation of the well construction equipment, and a control system for controlling the well construction system. The control system includes a processor and a memory storing a computer program code. The control system is operable to store a digital drilling program that includes an equipment operational plan and an electrical power plan. The equipment operational plan is indicative of planned well construction operations to be performed by the well construction equipment to construct the well. The electrical power plan is indicative of a planned electrical power demand of the well construction equipment to perform the planned well construction operations. The control system is also operable to cause the well construction equipment to perform the planned well construction operations indicated in the equipment operational plan.

The present disclosure also introduces an apparatus including a well construction system that includes well construction equipment operable to construct a well at a wellsite, a power supply system operable to output electrical power to the well construction equipment to facilitate operation of the well construction equipment, and a control system for controlling the well construction system. The control system includes a processor and a memory storing a computer program code. The control system is operable to store a digital drilling program that includes an equipment operational plan and an electrical power plan. The equipment operational plan is indicative of planned well construction operations to be performed by the well construction equipment to construct the well. The electrical power plan is indicative of a planned electrical power demand of the well construction equipment to perform the planned well construction operations. The control system is also operable to cause the well construction equipment to perform the planned well construction operations indicated in the equipment operational plan. The control system is also operable to cause the power supply system to output the electrical power to the well construction equipment based on the electrical power plan. The electrical power output by the power supply system meets the planned electrical power demand of the well construction equipment to perform the planned well construction operations. The control system is also operable to: determine an electrical power output capacity indicative of electrical power that the power supply system can output to the well construction equipment to perform the planned well construction operations; compare the electrical power output capacity to the planned electrical power demand; and, based on the comparison, adjust the planned well construction operations to adjust the planned electrical power demand.

The present disclosure also introduces a method that includes commencing operation of a control system of a well construction system. The well construction system is located at a wellsite and includes well construction equipment and a power supply system. The operating control system stores a digital drilling program that includes an equipment operational plan and an electrical power plan. The equipment operational plan is indicative of planned well construction operations to be performed by the well construction equipment to construct a well at the wellsite. The electrical power plan is indicative of a planned electrical power demand of the well construction equipment to perform the planned well construction operations. The operating control system also causes the well construction equipment to perform the planned well construction operations indicated in the equipment operational plan. The operating control system also causes the power supply system to output the electrical power to the well construction equipment based on the electrical power plan. The electrical power output by the power supply system meets the planned electrical power demand of the well construction equipment to perform the planned well construction operations.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
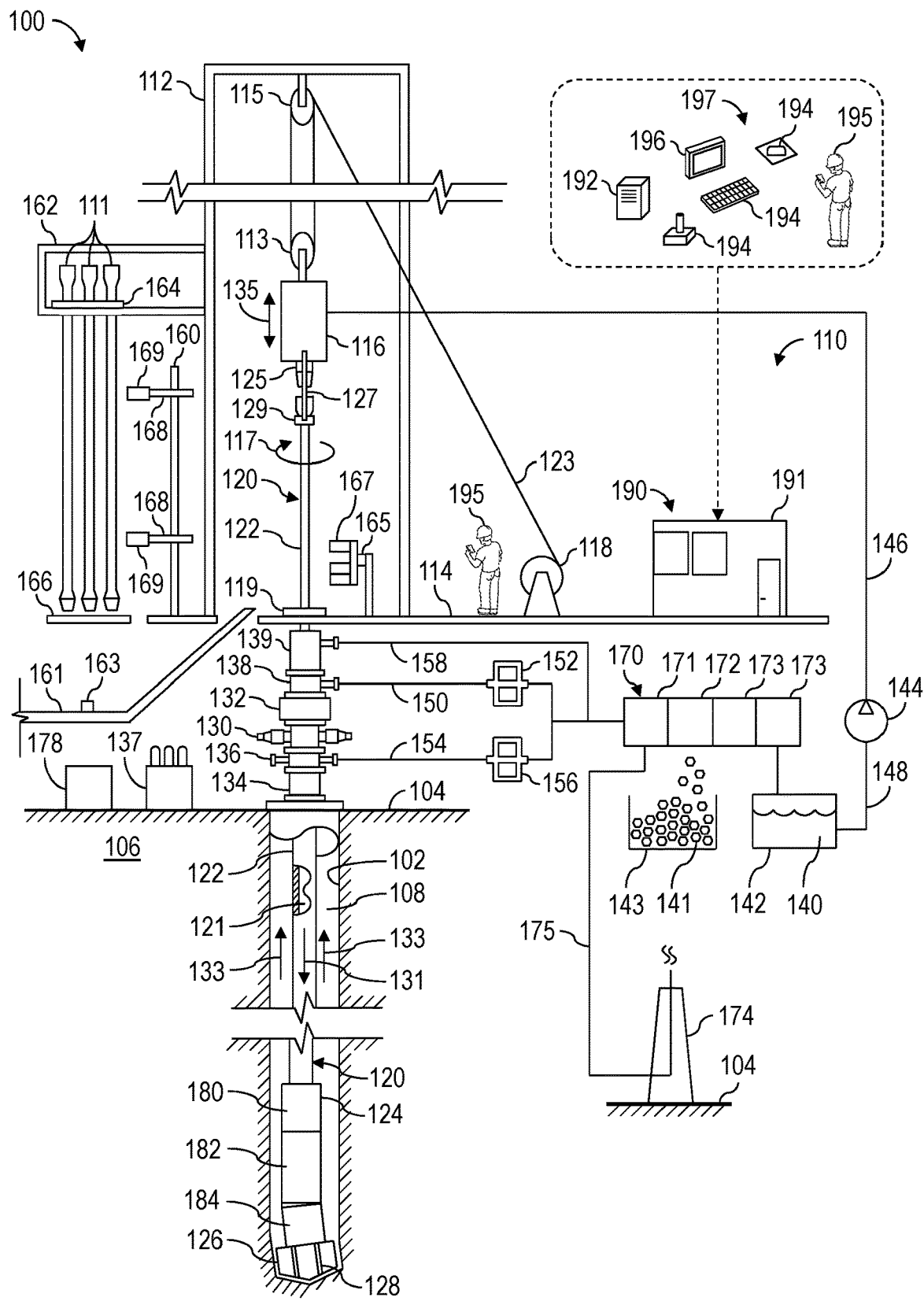
FIG. 1 is a schematic view of at least a portion of an example implementation of apparatus according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

Systems and methods (e.g., steps, processes, operations, etc.) according to one or more aspects of the present disclosure may be utilized or otherwise implemented in association with an automated well construction system (i.e., a well construction rig) at an oil and gas wellsite, such as for constructing a wellbore for extracting hydrocarbons (e.g., oil and/or gas) from a subterranean formation. However, one or more aspects of the present disclosure may be utilized or otherwise implemented in association with other automated systems in the oil and gas industry and other industries. For example, one or more aspects of the present disclosure may be implemented in association with wellsite systems for performing fracturing, cementing, acidizing, chemical injecting, and/or water jet cutting operations, among other examples. One or more aspects of the present disclosure may also be implemented in association with mining sites, building construction sites, and/or other work sites where automated machines or equipment are utilized.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well construction rig (e.g., a well drilling rig). Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 comprises various well construction equipment (i.e., wellsite equipment), including surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise a plurality of interconnected tubulars, such as drill pipe, heavy-weight drill pipe (HWDP), wired drill pipe (WDP), tough logging condition (TLC) pipe, and drill collars, among other examples. The conveyance means 122 may instead comprise coiled tubing for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor 184 connected with the drill bit 126. The BHA 124 may also include various downhole devices and/or tools 180, 182.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the rig floor 114. The crown block 115 and traveling block 113 comprise pulleys or sheaves around which the support line 123 is reeved to operatively connect the crown block 115, the traveling block 113, and the drawworks 118 (and perhaps an anchor). The drawworks 118 may thus selectively impart tension to the support line 123 to lift and lower the top drive 116, resulting in the vertical motion 135. The drawworks 118 may comprise a drum, a base, and a prime mover (e.g., an electric motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (e.g., an electric motor) (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The drill string 120 may be conveyed within the wellbore 102 through various fluid control devices disposed at the wellsite surface 104 on top of the wellbore 102 and perhaps below the rig floor 114. The fluid control devices may be operable to control fluid within the wellbore 102. The fluid control devices may include a blowout preventer (BOP) stack 130 for maintaining well pressure control comprising a series of pressure barriers (e.g., rams) between the wellbore 102 and an annular preventer 132. The fluid control devices may also include a rotating control device (RCD) 138 mounted above the annular preventer 132. The fluid control devices 130, 132, 138 may be mounted on top of a wellhead 134. A power unit 137 (i.e., a BOP control or closing unit) may be operatively connected with one or more of the fluid control devices 130, 132, 138 and operable to actuate, drive, operate, or otherwise control one or more of the fluid control devices 130, 132, 138. The power unit 137 may be or comprise a hydraulic fluid power unit fluidly connected with the fluid control devices 130, 132, 138 and selectively operable to hydraulically drive various portions (e.g., rams, valves, seals, etc.) of the fluid control devices 130, 132, 138. The power unit 137 may comprise one or more hydraulic pumps actuated by electric motors and operable to pressurize hydraulic fluid for operating the fluid control devices 130, 132, 138, as described herein.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid 140 (i.e., drilling mud), and one or more mud pump units 144 (i.e., drilling fluid pumps) operable to move the drilling fluid 140 from the container 142 into the fluid passage 121 of the drill string 120 via a fluid conduit 146 extending from the pump units 144 to the top drive 116 and an internal passage extending through the top drive 116. Each pump unit 144 may comprise a fluid pump (not shown) operable to pump the drilling fluid 140 and a prime mover (e.g., an electric motor) (not shown) operable to drive the corresponding fluid pump. The fluid conduit 146 may comprise one or more of a pump discharge line, a stand pipe, a rotary hose, and a gooseneck connected with a fluid inlet of the top drive 116. The pumps 144 and the container 142 may be fluidly connected by a fluid conduit 148, such as a suction line.

During drilling operations, the drilling fluid may continue to flow downhole through the internal passage 121 of the drill string 120, as indicated by directional arrow 131. The drilling fluid may exit the BHA 124 via ports 128 in the drill bit 126 and then circulate uphole through an annular space 108 of the wellbore 102 defined between an exterior of the drill string 120 and the wall of the wellbore 102, such flow being indicated by directional arrows 133. In this manner, the drilling fluid lubricates the drill bit 126 and carries formation cuttings uphole to the wellsite surface 104. The returning drilling fluid may exit the annular space 108 via different fluid control devices during different stages or scenarios of well drilling operations. For example, the drilling fluid may exit the annular space 108 via a bell nipple 139, the RCD 138, or a ported adapter 136 (e.g., a spool, cross adapter, a wing valve, etc.) located above one or more rams of the BOP stack 130.

During normal drilling operations, the drilling fluid may exit the annular space 108 via the bell nipple 139 and then be directed toward drilling fluid reconditioning equipment 170 via a fluid conduit 158 (e.g., a gravity return line) to be cleaned and/or reconditioned, as described below, before being returned to the container 142 for recirculation. During managed pressure drilling operations, the drilling fluid may exit the annular space 108 via the RCD 138 and then be directed into a choke manifold 152 (e.g., a managed pressure drilling choke manifold) via a fluid conduit 150 (e.g., a drilling pressure control line). The choke manifold 152 may include at least one choke and a plurality of fluid valves (neither shown) collectively operable to control the flow through and out of the choke manifold 152. Backpressure may be applied to the annular space 108 by variably restricting flow of the drilling fluid or other fluids flowing through the choke manifold 152. The greater the restriction to flow through the choke manifold 152, the greater the backpressure applied to the annular space 108. The drilling fluid exiting the choke manifold 152 may then pass through the drilling fluid reconditioning equipment 170 before being returned to the container 142 for recirculation. During well pressure control operations, such as when one or more rams of the BOP stack 130 is closed, the drilling fluid may exit the annular space 108 via the ported adapter 136 and be directed into a choke manifold 156 (e.g., a rig choke manifold or a well control choke manifold) via a fluid conduit 154 (e.g., a rig choke line). The choke manifold 156 may include at least one choke and a plurality of fluid valves (neither shown) collectively operable to control the flow of the drilling fluid through the choke manifold 156. Backpressure may be applied to the annular space 108 by variably restricting flow of the drilling fluid (and other fluids) flowing through the choke manifold 156. The drilling fluid exiting the choke manifold 156 may then pass through the drilling fluid reconditioning equipment 170 before being returned to the container 142 for recirculation.

Before being returned to the container 142, the drilling fluid returning to the wellsite surface 104 may be cleaned and/or reconditioned via the drilling fluid reconditioning equipment 170, which may include one or more of liquid gas (i.e., mud gas) separators 171, shale shakers 172, and other drilling fluid cleaning and reconditioning equipment 173. The liquid gas separators 171 may remove formation gases entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify chemical and/or physical properties or characteristics (e.g., rheology, density, etc.) of the drilling fluid. For example, the drilling fluid reconditioning equipment 170 may include a degasser, a desander, a desilter, a centrifuge, a mud cleaner, and/or a decanter, among other examples. The drilling fluid reconditioning equipment 170 may further include chemical containers and mixing equipment collectively operable to mix or otherwise add selected chemicals to the drilling fluid returning from the wellbore 102 to modify chemical and/or physical properties or characteristics of the drilling fluid being pumped back into the wellbore 102. Intermediate tanks/containers (not shown) may be utilized to hold the drilling fluid while the drilling fluid progresses through the various stages or portions 171, 172, 173 of the drilling fluid reconditioning equipment 170. The cleaned and reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 161 may have a horizontal portion and an inclined portion that extends between the horizontal portion and the rig floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the rig floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161. The tubular handling system may comprise a plurality of actuators collectively operable to move various portions of the tubular handling equipment to perform the methods and operations described herein. The actuators may be or comprise electric motors and/or hydraulic cylinders and rotary actuators. The hydraulic cylinders and rotary actuators may be powered by hydraulic power packs comprising hydraulic pumps actuated by electric motors to pressurize hydraulic fluid.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections. The iron roughneck may comprise a plurality of actuators collectively operable to move various portions of the iron roughneck to perform the methods and operations described herein. The actuators may be or comprise electric motors.

A set of slips 119 may be located on the rig floor 114, such as may accommodate therethrough the drill string 120 during tubular make up and break out operations and during the drilling operations. The slips 119 may be in an open position during drilling operations to permit advancement of the drill string 120, and in a closed position to clamp the upper end (e.g., the uppermost tubular) of the drill string 120 to thereby suspend and prevent advancement of the drill string 120 within the wellbore 102, such as during the make up and break out operations.

During drilling operations, the various well construction equipment of the well construction system 100 may progress through a plurality of coordinated well construction operations (i.e., operational sequences) to drill or otherwise construct the wellbore 102. The well construction operations may change based on a digital drilling program, status of the well, status of the subterranean formation, stage of drilling operations (e.g., tripping, drilling, tubular handling, etc.), and type downhole tubulars (e.g., drill pipe) utilized, among other examples.

During drilling operations, the hoisting system lowers the drill string 120 while the top drive 116 rotates the drill string 120 to advance the drill string 120 downward within the wellbore 102 and into the formation 106. During the advancement of the drill string 120, the slips 119 are in an open position, and the iron roughneck 165 is moved away or is otherwise clear of the drill string 120. When the upper end of the drill string 120 (i.e., upper end of the uppermost tubular of the drill string 120) connected to the drive shaft 125 is near the slips 119 and/or the rig floor 114, the top drive 116 ceases rotating and the slips 119 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the rig floor 114. The elevator 129 of the top drive 116 then grasps the protruding box end, and the drawworks 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 119. The iron roughneck 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The iron roughneck 165 then releases and moves clear of the drill string 120.

The grabber of the top drive 116 may then clamp onto the drill string 120. The drive shaft 125 is brought into contact with the upper end of the drill string 120 (e.g., the box end of the uppermost tubular) and rotated to make up a connection between the drill string 120 and the drive shaft 125. The grabber then releases the drill string 120, and the slips 119 are moved to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or another area) located adjacent to, along, or below the rig floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or another portion of the wellsite system 100. The fingerboard 164/setback 166 provide storage (e.g., a temporary storage) of tubulars 111 during various operations, such as during and between tripping out and tripping of the drill string 120. The THM 160 may comprise a plurality of actuators collectively operable to move various portions of the THM 160 to perform the methods and operations described herein. The actuators may be or comprise electric motors.

The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto one of the tubulars 111. The arms 168 of the THM 160 may extend and retract, and/or at least a portion of the THM 160 may be rotatable and/or movable toward and away from the drill string 120, such as may permit the THM 160 to transfer the tubular 111 between the fingerboard 164/setback 166 and the drill string 120.

To trip out the drill string 120, the top drive 116 is raised, the slips 119 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 165 then releases the drill string 120 and moves clear of the drill string 120.

The THM 160 may then move toward the drill string 120 to grasp the tubular suspended from the elevator 129. The elevator 129 then opens to release the tubular. The THM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The well construction system 100 may further comprise a power supply system 178 configured to supply electrical and mechanical (e.g., fluid) power for actuating or otherwise powering the surface equipment 110. The power supply system 178 may include one or more electric generators, electrical energy storage devices (e.g., batteries, capacitors, etc.), and fuel storage devices, among other examples. The power supply system 178 may also include various means (not shown) for transferring and/or distributing electrical power, mechanical power, and fuel to the well construction equipment and between various pieces of equipment of the power supply system 178, including electrical power conductors, electrical connectors, electrical relays, fluid conductors, fluid connectors, and fluid valves, among other examples.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, among other examples, may be monitored and controlled. The control center 190 may be located on the rig floor 114 or another location of the well construction system 100. The control center 190 may comprise a facility 191 (e.g., a room, a cabin, a trailer, etc.) containing a control workstation 197, which may be operated by rig personnel 195 (e.g., a driller or another human rig operator) to monitor and control various well construction equipment or portions of the well construction system 100. The control workstation 197 may comprise or be communicatively connected with a central controller 192 (e.g., a processing device, a computer, etc.), such as may be operable to receive, process, and output information to monitor operations of and provide control to one or more portions of the well construction system 100. For example, the central controller 192 may be communicatively connected with the various surface and downhole equipment described herein, and may be operable to receive signals from and transmit signals to such equipment to perform various operations described herein. The central controller 192 may store executable computer program code, instructions, and/or operational parameters or set-points, including for implementing one or more aspects of methods and operations described herein. The central controller 192 may be located within and/or outside of the facility 191. Although it is possible that the entirety of the central controller 192 is implemented within one device, it is also contemplated that one or more components or functions of the central controller 192 may be implemented across multiple devices, some or an entirety of which may be implemented as part of the control center 190 and/or located within the facility 191.

The control workstation 197 may be operable for entering or otherwise communicating control data (e.g., commands, signals, information, etc.) to the central controller 192 and other equipment controller by the rig personnel 195, and for displaying or otherwise communicating information from the central controller 192 to the rig personnel 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the central controller 192, the input and output devices 194, 196, and the various well construction equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, electric motors, hydraulics, actuators, valves, and/or other components not explicitly described herein may be included in the well construction system 100, and are within the scope of the present disclosure.

Figure 2:
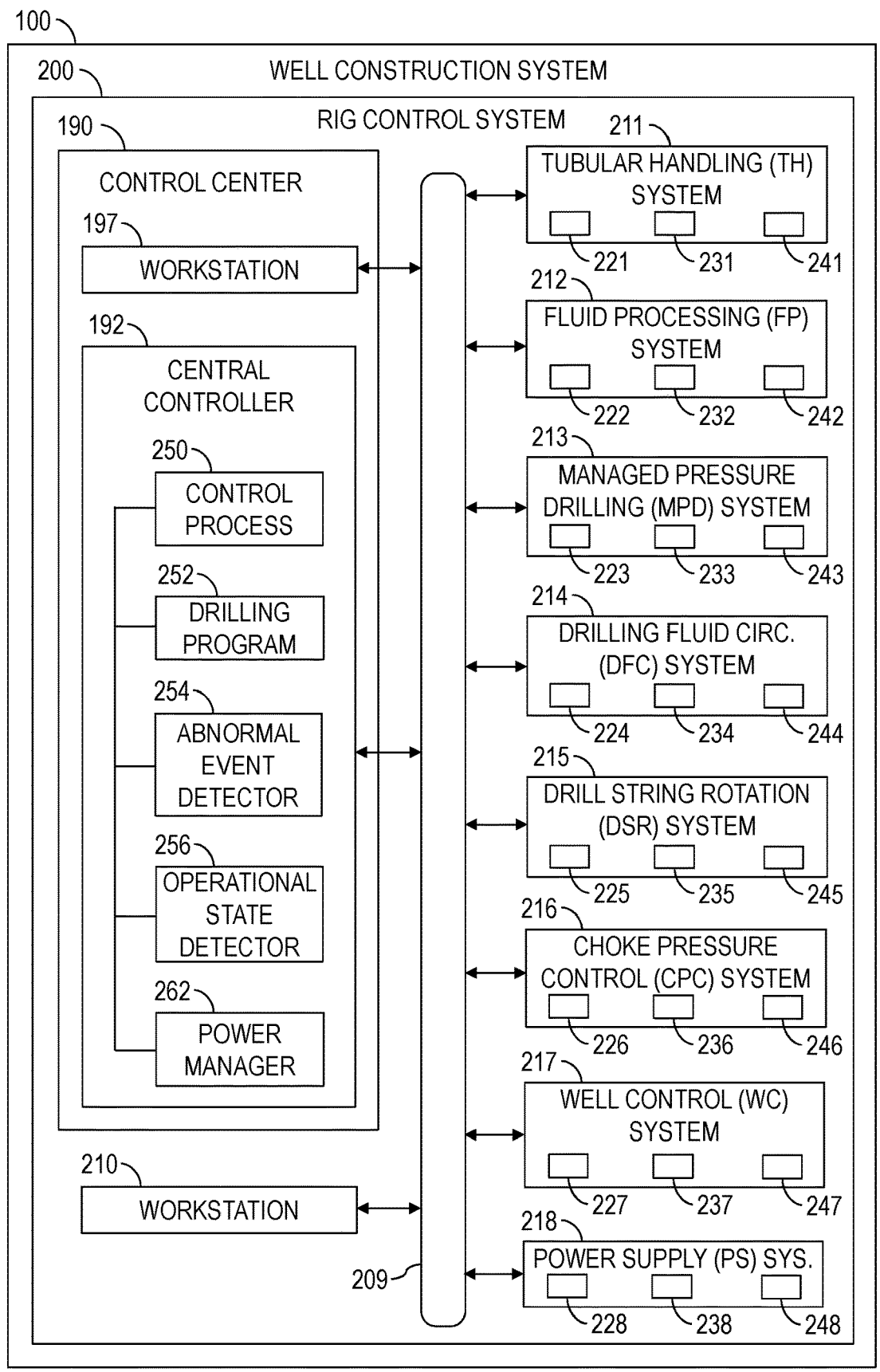
FIG. 2 is a schematic view of at least a portion of an example implementation of apparatus according to one or more aspects of the present disclosure.

The present disclosure further provides various implementations of systems and/or methods for controlling one or more portions of the well construction system 100. FIG. 2 is a schematic view of at least a portion of an example implementation of a drilling rig control system 200 (referred to hereinafter as a "rig control system") for monitoring and controlling various well construction equipment of the well construction system 100 shown in FIG. 1. The rig control system 200 may comprise one or more features of the well construction system 100, including where indicated by the same reference numerals. Accordingly, the following description refers to FIGS. 1 and 2, collectively.

The various pieces of well construction equipment described above and shown in FIGS. 1 and 2 may each comprise one or more (e.g., combustion, hydraulic, electrical, etc.) actuators, which when operated, may cause the corresponding well construction equipment to perform intended actions (e.g., work, tasks, movements, operations, etc.). Each piece of well construction equipment may further carry or comprise one or more sensors disposed in association with a corresponding actuator or another portion of the piece of equipment. Each sensor may be communicatively connected with a corresponding equipment controller and operable to generate sensor data (e.g., electrical sensor signals or measurements, feedback signals, feedback loop, etc.) indicative of an operational (e.g., mechanical, physical, etc.) status of the corresponding piece of well construction equipment or actuator of that piece of equipment, thereby permitting the operational status of the piece of equipment to be monitored by the equipment controller. The sensor data may be utilized by the equipment controller as feedback data, permitting operational control of the piece of well construction equipment and coordination with other well construction equipment.

The rig control system 200 may be in real-time communication with and utilized to monitor and/or control various portions, components, and equipment of the well construction system 100 described herein. The equipment of the well construction system 100 may be grouped into several subsystems, each operable to perform a corresponding operation and/or a portion of the well construction operations described herein. The subsystems may include a tubular handling (TH) system 211, a fluid processing (FP) system 212, a managed pressure drilling (MPD) system 213, a drilling fluid circulation (DFC) system 214, a drill string rotation system (DSR) system 215, a choke pressure control (CPC) system 216, a well pressure control (WC) system 217, and a power supply (PS) system 218.

The TH system 211 may include the support structure 112, a tubular hoisting system (e.g., the drawworks 118, the elevator links 127, the elevator 129, and/or the slips 119), a tubular handling system or equipment (e.g., the catwalk 161, the THM 160, the setback 166, and/or the iron roughneck 165), and/or other tubular handling equipment. Accordingly, the TH system 211 may perform tubular handling and hoisting operations. The TH system 211 may also serve as a support platform for tubular rotation equipment and staging ground for rig operations, such as connection make up and break out operations described above. The FP system 212 may include the drilling fluid reconditioning equipment 170, the flare stack 174, the containers 142, 143, and/or other equipment. Accordingly, the FP system 212 may perform fluid cleaning, reconditioning, and mixing operations. The MPD system 213 may include the RCD 138, the power unit 137, the choke manifold 152, and/or other equipment. The DFC system 214 may comprise the pumps 144, the drilling fluid container 142, the bell nipple 139, and/or other equipment collectively operable to pump and circulate the drilling fluid at the wellsite surface and downhole. The DSR system 215 may include the top drive 116 and/or the rotary table and kelly. The CPC system 216 may comprise the choke manifold 156, the ported adapter 136, and/or other equipment, and the WC system 217 may comprise the BOP stack 130, the power unit 137, and a BOP control station for controlling the power unit 137. The PS system 218 may comprise various sources of electrical power operable to power the well construction equipment of the well construction system 100, including the well construction equipment of the well construction subsystems 211-217. The PS system 218 may also include various means for transferring and/or distributing electrical power and fuel to the well construction equipment and between various pieces of equipment of the PS system 218, including electrical power conductors, electrical connectors, electrical relays, fluid conductors, fluid connectors, and fluid valves, among other examples. The sources of electrical power may include electric generators, electrical energy storage devices (e.g., batteries, capacitors, etc.), fuel storage devices, and a remote electrical power grid, among other examples. Each of the well construction subsystems 211-218 may further comprise various communication equipment (e.g., modems, network interface cards, etc.) and communication conductors (e.g., cables), communicatively connecting the equipment (e.g., sensors and/or actuators) of each subsystem 211-218 with a central controller 192 and a control workstation 197. Although the well construction equipment listed above and shown in FIG. 1 is associated with certain wellsite subsystems 211-218, such associations are merely examples that are not intended to limit or prevent such well construction equipment from being associated with two or more wellsite subsystems 211-218 and/or different wellsite subsystems 211-218.

The rig control system 200 may include various local controllers 221-228, each operable to control various well construction equipment of a corresponding subsystem 211-218 and/or an individual piece of well construction equipment of a corresponding subsystem 211-218. As described above, each well construction subsystem 211-218 includes various well construction equipment comprising corresponding actuators 241-248 for performing operations of the well construction system 100. Each subsystem 211-218 may include various sensors 231-238 operable to generate sensor data (e.g., signals, information, measurements, etc.) indicative of operational status of the well construction equipment of each subsystem 211-218. Each local controller 221-228 may output control data (e.g., commands, signals, information, etc.) to one or more actuators 241-248 to perform corresponding actions of a piece of equipment or subsystem 211-218. Each local controller 221-228 may receive sensor data generated by one or more sensors 231-238 indicative of operational status of an actuator or another portion of a piece of equipment or subsystem 211-218. Although the local controllers 221-228, the sensors 231-238, and the actuators 241-248 are each shown as a single block, it is to be understood that each local controller 221-228, sensor 231-238, and actuator 241-248 may be or comprise a plurality of local controllers, sensors, and actuators.

The sensors 231-238 may include sensors utilized for operation of the various subsystems 211-218 of the well construction system 100. For example, the sensors 231-238 may include cameras, position sensors, speed sensors, acceleration sensors, pressure sensors, force sensors, temperature sensors, flow rate sensors, vibration sensors, electrical current sensors, electrical voltage sensors, resistance sensors, gesture detection sensors or devices, voice actuated or recognition devices or sensors, chemical sensors, exhaust sensors, and/or other examples. The sensor data may include signals, information, and/or measurements indicative of equipment operational status (e.g., on or off, percent load, up or down, set or released, etc.), drilling parameters (e.g., depth, hook load, torque, etc.), auxiliary parameters (e.g., vibration data of a pump), flow rate, temperature, operational speed, position, and pressure, among other examples. The acquired sensor data may include or be associated with a timestamp (e.g., date and/or time) indicative of when the sensor data was acquired. The sensor data may also or instead be aligned with a depth or other drilling parameter.

The local controllers 221-228, the sensors 231-238, and the actuators 241-248 may be communicatively connected with the central controller 192. For example, the local controllers 221-228 may be in communication with the sensors 231-238 and actuators 241-248 of the corresponding subsystems 211-218 via local communication networks (e.g., field buses) (not shown) and the central controller 192 may be in communication with the subsystems 211-218 via a central communication network 209 (e.g., a data bus, a field bus, a wide-area-network (WAN), a local-area-network (LAN), etc.). The sensor data generated by the sensors 231-238 of the subsystems 211-218 may be made available for use by the central controller 192 and/or the local controllers 221-228. Similarly, control data output by the central controller 192 and/or the local controllers 221-228 may be automatically communicated to the various actuators 241-248 of the subsystems 211-218, perhaps pursuant to predetermined programming, such as to facilitate well construction operations and/or other operations described herein. Although the central controller 192 is shown as a single device (i.e., a discrete hardware component), it is to be understood that the central controller 192 may be or comprise a plurality of equipment controllers and/or other electronic devices collectively operable to monitor and control operations (i.e., computational processes or methods) of the well construction system. The central controller 192 may be located within or form a portion of a control center 190, however a portion of the central controller 192 may instead be external to the control center 190.

The sensors 231-238 and actuators 241-248 may be monitored and/or controlled by corresponding local controllers 221-228 and/or the central controller 192. For example, the central controller 192 may be operable to receive sensor data from the sensors 231-238 of the wellsite subsystems 211-218 in real-time, and to output real-time control data directly to the actuators 241-248 of the subsystems 211-218 based on the received sensor data. However, certain operations of the actuators 241-248 of each subsystem 211-218 may be controlled by a corresponding local controller 221-228, which may control the actuators 241-248 based on sensor data received from the sensors 231-238 of the corresponding subsystem 211-218 and/or based on control data received from the central controller 192.

The rig control system 200 may be a tiered control system, wherein control of the subsystems 211-218 of the well construction system 100 may be provided via a first tier of the local controllers 221-228 and a second tier of the central controller 192. The central controller 192 may facilitate control of one or more of the subsystems 211-218 at the level of each individual subsystem 211-218. For example, in the FP system 212, sensor data may be fed into the local controller 242, which may respond to control the actuators 232. However, for control operations that involve multiple subsystems 211-218, the control may be coordinated through the central controller 192 operable to coordinate control of well construction equipment of two, three, four, or more (each) of the subsystems 211-218. For example, coordinated control operations may include the control of downhole pressure during tripping. The downhole pressure may be affected by the DFC system 214 (e.g., pump rate), the MPD system 213 (e.g., position of the choke 152), and the TH system 211 (e.g., tripping speed). Thus, when it is intended to maintain certain downhole pressure during tripping, the central controller 192 may output control data to two or more of the participating subsystems 211-218.

As described above, the central controller 192 may control various operations of the subsystems 211-218 via analysis of sensor data from one or more of the wellsite subsystems 211-218 to facilitate coordinated control between the subsystems 211-218. The central controller 192 may generate control data to coordinate operations of various well construction equipment of the subsystems 211-218. The control data may include, for example, commands from rig personnel, such as turn on or turn off a pump, switch on or off a fluid valve, and update a physical property set-point, among other examples. The local controllers 221-228 may each include a fast control loop that directly obtains sensor data and executes, for example, a control algorithm to generate the control data. The central controller 192 may include a slow control loop to periodically obtain sensor data and generate the control data.

The rig control system 200, including the central controller 192 and the local controllers 221-228, facilitates operation of the well construction equipment in an equipment focused manner, such as to maintain the choke pressure to a certain value or to rotate the drill string at a certain rotational speed. The rig control system 200 may also coordinate operations of certain pieces of equipment to achieve intended operations, such as to move a tubular from the fingerboard to the well center, break up a tubular stand from the well center, or rack an individual tubular back to the fingerboard. Each such operation utilizes coordinated control of multiple pieces of pipe handling equipment by the central controller 192.

The central controller 192, the local controllers 221-228, and/or other controllers or processing devices (referred to hereinafter as "equipment controllers") of the rig control system 200 may each or collectively be operable to receive and store machine-readable and executable program code instructions (e.g., computer program code, algorithms, programmed processes or operations, etc.) on a memory device (e.g., a memory chip) and then execute the program code instructions to run, operate, or perform a control process for monitoring and/or controlling the well construction equipment of the well construction system 100.

The central controller 192 may run (i.e., execute) a control process 250 (e.g., a coordinated control process or anther computer process) and each local controller 221-228 may run a corresponding control process (e.g., a local control process or another computer process) (not shown). Two or more of the local controllers 221-228 may run their local control processes to collectively coordinate operations between well construction equipment of two or more of the subsystems 211-218. The control process 250 of the central controller 192 may operate as a mechanization manager of the rig control system 200, coordinating well construction operations of the well construction equipment of the well construction system 100. The control process 250 of the central controller 192 may output control data directly to the actuators 241-248 to control the well construction operations. The control process 250 may also or instead output control data to the control process of one or more local controllers 221-228, wherein each control process of the local controllers 221-228 may then output control data to the actuators 241-248 of the corresponding subsystem 211-218 to control a portion of the well construction operations performed by that subsystem 211-218. Thus, the control processes of equipment controllers (e.g., the central controller 192 and/or the local controllers 221-228) of the rig control system 200 individually and collectively perform monitoring and control operations described herein, including monitoring and controlling well construction operations. The program code instructions forming the basis for the control processes described herein may comprise rules (e.g., algorithms) based on the laws of physics for drilling and other well construction operations.

Each control process being run by an equipment controller of the rig control system 200 may receive and process (i.e., analyze) sensor data from the sensors 231-238 according to the program code instructions, and generate control data (i.e., control signals or information) to operate or otherwise control the actuators 241-248 of the well construction equipment. Equipment controllers within the scope of the present disclosure can include, for example, programmable logic controllers (PLCs), industrial computers (IPCs), personal computers (PCs), soft PLCs, variable frequency drives (VFDs) and/or other controllers or processing devices operable to store and execute program code instructions, receive sensor data, and output control data to cause operation of the well construction equipment based on the program code instructions, sensor data, and/or control data.

The well construction system 100 may instead be monitored and operated manually by rig personnel (e.g., a driller, operational planner, maintenance supervisor, etc.) via a central control workstation 197 and/or a remote control workstation 210. The control workstations 197, 210 may be utilized to monitor, configure, control, and/or otherwise operate one or more of the subsystems 211-218 by the rig personnel. The control workstations 197, 210 may be communicatively connected with the central controller 192 and/or the local controllers 221-228 via the communication network 209 and operable to receive sensor data from the sensors 231-238 and transmit control data to the central controller 192 and/or the local controllers 221-228 to control the actuators 241-248. The control workstations 197, 210 may be operable for entering or otherwise communicating control data to the central controller 192 and/or the local controllers 221-228 by the rig personnel for controlling the well construction equipment of the well construction system 100. Accordingly, the control workstations 197, 210 may be utilized by the rig personnel to monitor and control the actuators 241-248 and other portions of the subsystems 211-218 via the central controller 192 and/or local controllers 221-228.

The control workstations 197, 210 may be operable for displaying or otherwise communicating sensor data output by the sensors 231-238 to the rig personnel, thereby permitting the rig personnel to monitor the subsystems 211-218. For example, the control workstations 197, 210 may be operable to display to the rig personnel the present (i.e., current) operational status of the well construction equipment, including of the various sources of electrical power of the PS system 218. Each workstation 197, 210 may be or comprise a terminal, a computer, or another device comprising one or more input devices (e.g., a keyboard, a mouse, a joystick, a touchscreen, etc.) and one or more output devices (e.g., a video monitor, a touchscreen, a printer, audio speakers, etc.). Communication between each workstation 197, 210 and the central controller 192 may be via wired and/or wireless communication means. The control workstation 197 may be located within the control center 190 and utilized by the driller. The control workstation 210 may be located in association with one or more of the equipment subsystems 211-218 or otherwise externally from the control center 190, and utilized by other rig personnel, such operational planners and maintenance personnel.

During manual operation, the rig personnel may be or operate as the mechanization manager of the rig control system 200 by manually coordinating operations of various well construction equipment, such as to achieve an intended operational status (or drilling state) of the well construction operations, such as tripping in or drilling at an intended rate of penetration (ROP). The control process of each local controller 221-228 may facilitate a lower (e.g., basic) level of control within the rig control system 200 to operate a corresponding piece of well construction equipment or a plurality of pieces of well construction equipment of a corresponding subsystem 211-218. Such control process may facilitate, for example, starting, stopping, and setting or maintaining an operational speed of a piece of well construction equipment. During manual operation of the well construction system 100, rig personnel manually controls the individual pieces of well construction equipment to achieve the intended operational status of each piece of well construction equipment.

The central controller 192 may be operable to receive and store machine-readable and executable program code instructions on a memory device and then execute such program code instructions to run, operate, or perform a power manager 262 (e.g., a power control process, a power management process, and/or another computer process) operable to monitor and control the PS system 218 of the well construction system 100. The program code instructions forming the basis for the power manager 262 described herein may comprise or be based on, for example, optimum efficiency performance curves or data of the various pieces of equipment forming the PS system 218. The power manager 262 run of the central controller 192 may operate to monitor and control generation and distribution of electrical power performed by the PS system 218. The power manager 262 may receive and process (e.g., analyze) sensor data from the sensors 238 according to the program code instructions to monitor performance of the PS system 218, and generate control data (i.e., control signals or information) to operate or otherwise control the actuators 248 of the PS system 218 thereby controlling operations of the PS system 218. The power manager 262 may output control data directly to the actuators 248 to control the generation and distribution of electrical power. The power manager 262 may also or instead output control data to one or more local controllers 228, wherein each of the local controllers 228 may then output control data to the actuators 248 of the PS system 218 to control a portion of the power generation and distribution operations performed by the PS system 218. The power manager 262 may also or instead output control data to the actuators 248 and/or one or more local controllers 228 via the control process 250. The electrical actuators 248 may comprise one or more of electric motors, linear actuators, magnetic coils, switches, and relays, among other examples.

The central controller 192 may comprise a memory device operable to receive and store a digital drilling program 252 (i.e., a digital well construction plan) for drilling and otherwise constructing a planned well. The digital drilling program 252 may include well specifications, operational parameters of the well construction equipment, and other information indicative of the planned well and the well construction equipment of the well construction system 100. For example, the digital drilling program 252 may include properties of the subterranean formation through which the planned well is to be drilled, the path (e.g., direction, curvature, orientation, etc.) along which the planned well is to be drilled through the formation, the depth (e.g., true vertical depth (TVD), measured depth (MD)) of the planned well, operational specifications (e.g., power output, weight, torque capabilities, speed capabilities, dimensions, size, etc.) of the well construction equipment (e.g., top drive, mud pumps, 144, downhole mud motor 184, etc.) that is planned to be used to construct the planned well, and/or specifications (e.g., diameter, length, weight, etc.) of tubulars (e.g., drill pipe) that are planned to be used to construct the planned well. The digital drilling program 252 may include knowledge (e.g., efficiency of various parameters) learned from offset wells that have been drilled. Optimal parameters associated with the offset wells may then be used as the recommended parameters in a digital drilling program 252 for the present well. The knowledge learned from the offset wells, including operational limits, such as maximum WOB, RPM, ROP, and/or tripping speed versus depth, may be applied and used as an operational limit within the digital drilling program 252.

The digital drilling program 252 may further include an equipment operational plan (or schedule) indicative of planned well construction operations (e.g., tasks, operational sequences, etc.) that are intended to be performed by the well construction equipment as part of the well construction operations to construct the well. Each planned well construction operation may comprise a plurality of operational sequences and may be performed by the well construction equipment as part of the well construction operations to construct the well. The equipment operational plan may comprise order and/or time of each planned well construction operation. A planned well construction operation may be or comprise drilling a predetermined portion or depth of the planned well, completing a predetermined portion or stage of drilling operations, drilling through a predetermined section of the subterranean formation, and performing a predetermined plurality of operational sequences, among other examples. Each planned well construction operation may comprise a plurality or sequence of physical (i.e., mechanical) operations (i.e., actions) performed by various pieces of well construction equipment. Example planned well construction operations may include operations of one or more pieces of the well construction equipment of the well construction system 100 described above in association with FIG. 1. The equipment operational plan of the digital drilling program 252 may further include planned operational parameters of the well construction equipment during each planned well construction operation included in the digital drilling program 252, such as weight on bit (WOB), drilling fluid flow rate, top drive speed (RPM), and ROP as a function of wellbore depth. The equipment operational plan of the digital drilling program 252 may include detailed information indicative of each planned well construction operation to accomplish an intended drilling objective (e.g., complete drilling of the well or complete drilling of a section of the well), or the equipment operational plan may include general information to accomplish the drilling objective.

The digital drilling program 252 may also include an electrical power plan (or schedule) indicative of level or amount of planned (e.g., projected, estimated, expected, etc.) level or amount of electrical power demand of the well construction equipment for performing or otherwise associated with each corresponding planned well construction operation indicated in the equipment operational plan of the digital drilling program 252. Thus, the electrical power plan may comprise information (e.g., a plan, a schedule, a sequence, a profile) indicative of the amount or level of planned electrical power demand that has to be met for each piece of well construction equipment to perform each planned well construction operation. The electrical power plan may include detailed information indicative of planned electrical power demand of each piece of equipment to complete each planned well construction operation to accomplish an intended drilling objective. However, the electrical power plan may include summary information indicative of planned overall or total electrical power demand of the well construction equipment to accomplish the intended drilling objective. The electrical power plan may also comprise information indicative of level or amount of planned (e.g., projected, estimated, expected, etc.) level or amount of electrical power output capacity (i.e., available electrical power limit) that the PS system 218 can supply (e.g., generate or output) to the various well construction equipment of the well construction system 100, including the well construction equipment of the subsystems 211-218, such as to facilitate performance of the equipment operational plan of the digital drilling program 252. The planned electrical power output capacity may be calculated or otherwise determined by the power manager 262 based on the planned electrical power demand, such that the PS system 218 can supply an amount of electrical power that is sufficient to power the well construction equipment to perform the planned well construction operations. Thus, the planned electrical power output capacity may be indicative of a planned maximum electrical power that the PS system 218 can output to the well construction equipment to perform the planned well construction operations. The planned electrical power output capacity indicated in the electrical power plan may be greater than or equal to the planned electrical power demand indicated in the electrical power plan.

The information forming the digital drilling program 252 may originate or be delivered in digital format, such that it can be directly loaded to or saved by a memory device of the central controller 192. The digital drilling program 252 can be executed or analyzed programmatically by the control process 250 and/or the power manager 262 of the central controller 192 without human intervention. The memory device storing the digital drilling program 252 may be or form a portion of the central controller 192 or the memory device storing the digital drilling program 252 may be communicatively connected with the central controller 192. The control process 250 and/or the power manager 262 may analyze the digital drilling program 252 and generate or output control data to the local controllers 221-228 or directly to the actuators 241-248 to control the well construction equipment to cause, facilitate, or otherwise implement one or more aspects of methods and operations described herein. As further described below, the equipment operational plan and the electrical power plan of the digital drilling program 252 may be entered and/or adjusted (e.g., changed, recalibrated, modified, delayed, etc.) manually the by the rig personnel drilling via the workstations 197, 210 or automatically by one or more processes (e.g., the control process 250 and/or the power manager 262) of the central controller 192.

An equipment controller of the rig control system 200 for controlling the well construction system 100 may be operable to automate the well construction equipment to perform well construction operations and change such well construction operations as operational parameters of the well construction operations change and/or when an abnormal event (e.g., state and/or condition) is detected during the well construction operations. An equipment controller may be operable to detect an abnormal event based on the sensor data received from the sensors 231-238 and cause the predetermined operations to be performed or otherwise implemented to stop or mitigate the abnormal event or otherwise in response to the abnormal event, without manual control of the well construction equipment by the rig personnel via the control workstation 197, 210. For example, an equipment controller may be operable to make decisions related to selection of actions or sequences of well construction operations that are to be implemented during the well construction operations and/or the manner (e.g., speed, torque, mechanical power, electrical power, etc.) in which such selected well construction operations are to be implemented to stop or mitigate a detected abnormal event. An equipment controller may be further operable to receive and store information that may be analyzed by the control process 250 to facilitate the equipment controller to detect the abnormal event, and select and implement the well construction operations to stop or mitigate the abnormal event.

The central controller 192 may be operable to receive and store machine-readable and executable program code instructions on a memory device and then execute such program code instructions to run, operate, or perform an abnormal event detector 254 (e.g., an abnormal event detecting computer process), which may be operable to analyze or otherwise process the sensor data received from the sensors 231-238 and detect an abnormal event (e.g., state and/or condition) experienced by or otherwise associated with one or more pieces of well construction equipment, and/or an abnormal event experienced by or otherwise associated with a wellbore (e.g., the wellbore 102 shown in FIG. 1). The abnormal event detector 254 may be operable to detect the abnormal events based on the sensor data and output abnormal event data indicative of the detected abnormal event. One or more of the local controllers 221-228 may also execute program code instructions to execute a corresponding abnormal event detector 254 to detect a local abnormal event. The local controllers 221-228 may then transmit data indicative of the local abnormal event to the central controller 190 for analysis. One or more of the processes of the central controller 192 may then re-plan the planned well construction operations based on the detected abnormal events or otherwise based on the condition of the well and/or the well construction equipment.

For example, an abnormal event may be or comprise an abnormal operational surface event experienced by surface equipment (e.g., the surface equipment 110 shown in FIG. 1) and/or an abnormal operational downhole event experienced by a drill string (e.g., the drill string 120 shown in FIG. 1). An example abnormal operational downhole event may include stick slip, axial vibrations, lateral vibrations, rotational vibrations, and stuck drill pipe. The abnormal event may instead be or comprise an abnormal downhole fluid event experienced by a downhole fluid, such as wellbore fluid (e.g., drilling fluid and/or formation fluid) within the wellbore, and/or formation fluid within a rock formation (e.g., rock formation 106 shown in FIG. 1) through which the wellbore extends. An example abnormal downhole fluid event may include underpressure of the formation fluid, overpressure of the formation fluid, gains of the wellbore fluid, and losses of the wellbore fluid.

The central controller 192 may be operable to receive and store machine-readable and executable program code instructions on a memory device and then execute such program code instructions to run, operate, or perform an operational state detector 256 (e.g., an operational state detecting computer process), which may be operable to analyze or otherwise process the sensor data received from the sensors 231-238 and detect a state (e.g., a status or stage) of the well construction operations the well construction system 100 is performing. The operational state detector 256 may then output operational state data indicative of the operational state of the well construction system 100. Operational states of the well construction system 100 may comprise, for example, drilling, tripping, circulating, and reaming. The control process 250 and/or the power manager 262 may be operable to automatically operate the well construction equipment based on abnormal events detected by the abnormal event detector 254 and/or based on an operational state of the well construction system 100 detected by the operational state detector 256.

Figure 3:
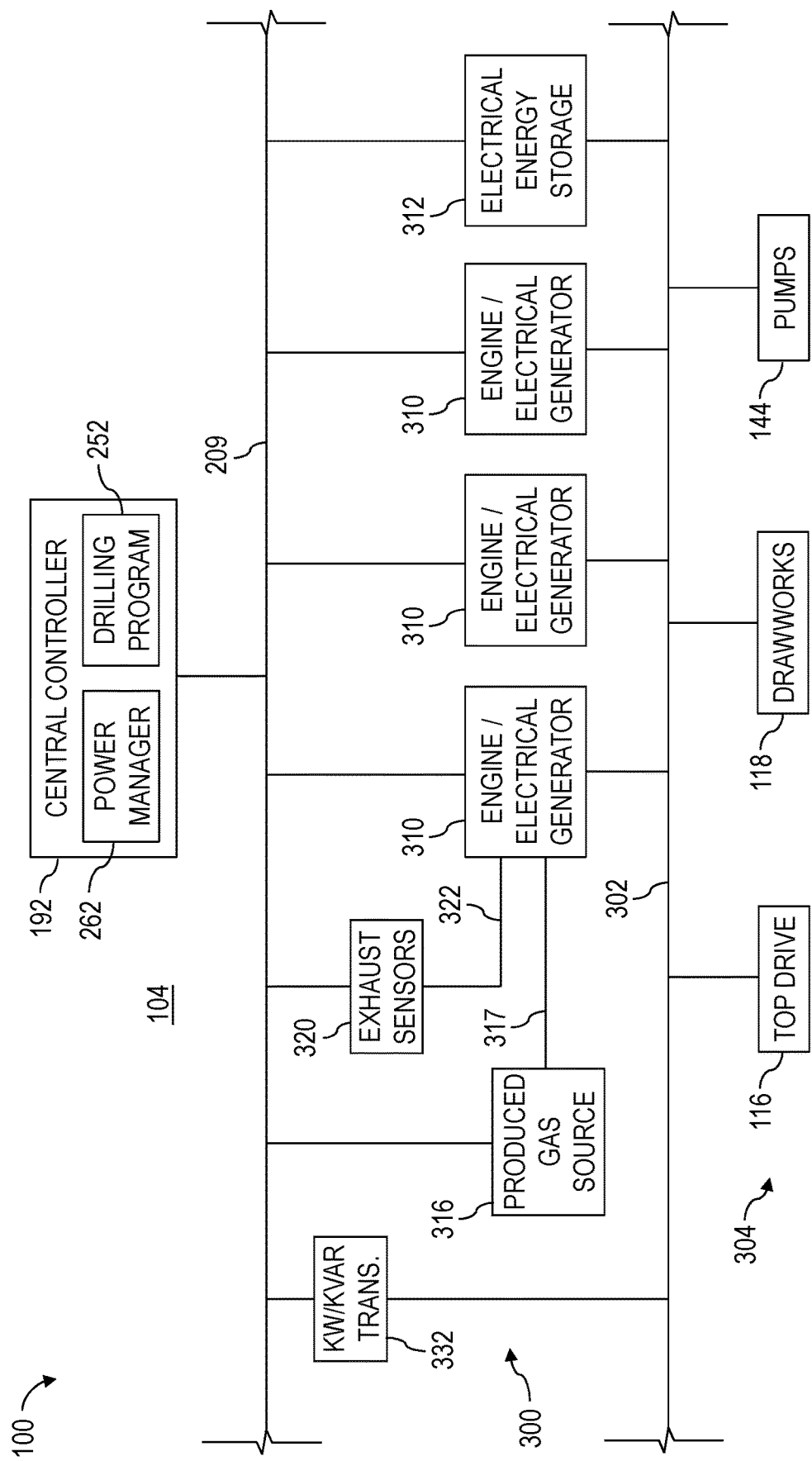
FIG. 3 is a schematic view of at least a portion of an example implementation of apparatus according to one or more aspects of the present disclosure.

FIG. 3 is a schematic view of at least a portion of an example implementation of a PS system 300 of a well construction system 100. The PS system 300 may be communicatively connected with and controlled by the central controller 192 shown in FIGS. 1 and 2. The PS system 300 may be an example implementation of, and/or comprise one or more features of, the PS system 218 shown in FIG. 2. Accordingly, the following description refers to FIGS. 1-3, collectively.

The PS system 300 may comprise a plurality of sources of electrical power electrically connected to an electrical power supply line 302 (e.g., a 600 volt/60 Hertz main line or bus and/or other electrical networks) of the well construction system 100, such as may permit the electrical power sources to output electrical power to wellsite equipment 304 via the line 302. The electrical power sources may comprise a plurality of combustion engine/electric generator units (hereinafter referred to as "generator units") 310 and one or more electrical energy storage units 312 (i.e., electrical storage systems). The PS system 300 may also comprise a source 316 of hydrocarbon or other combustible gas produced at the wellsite 104 during the well construction operations fluidly or otherwise operatively connected to each of the generator units 310. The central controller 192 may be communicatively connected with the electrical power sources 310, 312 and the produced gas source 316 via the communication network 209 to permit communication of sensor data (e.g., output data, feedback data, etc.) to the central controller 192, thereby permitting the central controller 192 to monitor operational status of the electrical power sources 310, 312 and the produced gas source 316. The central controller 192 may also be communicatively connected with the electrical power sources 310, 312 via the communication network 209 to permit communication of control data (e.g., output data, control commands, etc.) from the central controller 192 to the electrical power sources 310, 312, thereby permitting the central controller 192 to control operational parameters of the electrical power sources 310, 312 and the produced gas source 316. Electrical actuators of the wellsite equipment 304, such as the well construction equipment of one or more of the well construction subsystems 211-217, may be electrically connected with the line 302, such as may permit the wellsite equipment 304 to receive electrical power to facilitate well construction operations performed by the wellsite equipment 304. The wellsite equipment 304 may include, for example, electric motors of the top drive 116, the drawworks 118, and the mud pumps 144. For the sake of clarity, FIG. 3 shows the produced gas source 316 connected to just one generator unit 310. However, it is to be understood that the produced gas source 316 may be fluidly connected to an engine of each of the generator units 310.

The well construction system 100 may comprise, for example, two, three, four, five, six, or more generator units 310. Each generator unit 310 may comprise a combustion engine (e.g., a diesel engine, a diesel/natural gas mixture engine, a gas turbine, etc.) mechanically connected with and configured to rotate or otherwise actuate an electric generator to output electrical power to the line 302. Each generator unit 310 may further comprise a local control system comprising various electrical controllers and actuators (e.g., speed controller, voltage controller, electrical connectors, switches, circuit breakers, relays, etc.) for controlling operational parameters of the generator unit 310, as well as a plurality of sensors for monitoring operational status of the generator unit 310. The generator units 310 may be skidded or otherwise mounted to a frame permitting transportation (e.g., via roadways) and installation (e.g., via cranes or lifts) at the wellsite 104.

Each generator unit 310 may be communicatively connected with the central controller 192, such as may permit the power manager 262 to output control data to control operation of each generator unit 310, including to control operational status (e.g., on/off status) of each generator unit 310 and/or to control the amount of electrical power that is output to the line 302 or otherwise made available to the wellsite equipment via the line 302. The power manager 262 may receive various sensor data from the generator units 310, analyze such sensor data, and output control data to the generator units 310 to control operation of the generator units 310 based on the received sensor data. The sensor data output by each generator unit 310 to the power manager 262 may comprise data indicative of, for example, present operational status of the engine and/or the electric generator, present fault status, present operational speed of the engine and/or the electric generator, present throttle position of the engine, present engine load (e.g., load percentage with respect to maximum engine load), present electrical power generated, present engine power output, present electrical voltage generated, present electrical current generated, present fuel (e.g., gasoline, diesel fuel, and/or produced gas) consumption rate (e.g., flow rate) of the engine, and present temperature of the engine and/or the electric generator. The control data output by the power manager 262 to each generator unit 310 may comprise data indicative of, for example, intended operational status of the engine and/or the electric generator, intended operational speed of the engine and/or the electric generator, intended throttle position of the engine, intended engine load, intended electrical power generated, intended engine power output, intended electrical voltage generated, intended electrical current generated, intended fuel consumption rate of the engine, and intended blackout limits.

One or more exhaust sensors 320 (e.g., sniffers) may be operatively connected with or along an exhaust port or the line 322 of each generator unit 310. The exhaust sensors 320 may be operable to output sensor data (e.g., sensor signals or measurements) indicative of various quantitative and qualitative properties of the exhaust output by the engine of each generator unit 310. The exhaust sensors 320 may be communicatively connected with the central controller 192, such as may permit the power manager 262 to receive the sensor data (i.e., feedback data) from the exhaust sensors 320 to monitor operational status of the engines, analyze such sensor data, and output control data to the generator units 310 to control operation of the generator units 310 and the produced gas source 316 based on the received sensor data. The sensor data output by the exhaust sensors 320 to the power manager 262 may comprise data indicative of, for example, quantity of particulate material (PM), quantity of carbon monoxide (CO), quantity of carbon dioxide ($CO_2$), quantity of nitric oxide (NO), and quantity of nitrogen dioxide ($NO_2$) (collectively referred to hereinafter as "exhaust emissions"). For the sake of clarity, FIG. 3 shows just one exhaust sensor 320 connected to one generator unit 310. However, it is to be understood that the PS system 300 may comprise additional exhaust sensors 320, each connected to an engine of a corresponding generator unit 310.

The storage unit 312 may comprise a plurality of electrical storage devices (e.g., batteries, capacitors, etc.) connected in series and in parallel, and collectively operable to store a predetermined amount of electrical power and then output such electrical power to operate or help operate one or more components of the wellsite equipment 304 for a predetermined period of time. For example, the storage unit 312 may supplement the generator units 310 by temporarily supplying electrical power during power demand spikes. The storage unit 312 may be operable to store, for example, between about 0.5-1.0 megawatt-hours of electrical power. The storage unit 312 may be operable to output the stored electrical energy at maximum rates ranging, for example, between about 1.0-1.5 megawatts.

The electrical energy storage unit 312 may be operable to selectively receive and store electrical power generated by the generator units 310, and then selectively output the stored electrical power to the various electric actuators of the wellsite equipment 304. The storage unit 312 may further comprise a bi-directional inverter operable to convert the alternating current (AC) supplied by the generator units 310 to direct current (DC) power for storage by the electrical storage devices, and convert the DC power stored by the electrical storage devices to AC power for use by the wellsite equipment 304. However, instead of comprising the rechargeable electrical storage devices, the storage unit 312 may comprise one or more non-rechargeable electrical storage devices (e.g., non-rechargeable batteries) storing a fixed amount of electrical power. The non-rechargeable electrical storage devices may store a predetermined amount of electrical power and then output such electrical power to operate or help operate one or more components of the wellsite equipment 304 for a predetermined period of time. After the stored electrical power is drained from the non-rechargeable electrical storage devices, the non-rechargeable electrical storage devices can be replaced with new (charged) non-rechargeable electrical storage devices. If non-rechargeable electrical storage devices are used, the storage unit 312 may comprise just a unidirectional inverter to convert the DC power stored by the electrical storage devices to AC power for use by the wellsite equipment 304. The storage unit 312 may further comprise a control system comprising various electric controllers and actuators (e.g., electrical connectors, switches, circuit breakers, relays, etc.) for controlling operational parameters of the storage unit 312 and a plurality of sensors for monitoring operational status of the storage unit 312. The storage unit 312 may be skidded or otherwise mounted to a frame permitting transportation (e.g., via roadways) and installation (e.g., via cranes or lifts) at the wellsite 104.

The electrical energy storage unit 312 may be communicatively connected with the central controller 192, such as may permit the power manager 262 to output control data to control operation of the storage unit 312, including to control operational status (e.g., on/off status, charge/discharge, rate of charge/discharge, etc.) of each storage unit 312 and/or to control the amount of electrical power that is output to the line 302 or otherwise made available to the wellsite equipment 304 via the line 302. The power manager 262 may receive various sensor data (i.e., feedback data) from the sensors of the storage unit 312, analyze such sensor data, and output control data to the storage unit 312 to control operation of the storage unit 312 based on the received sensor data and other data. The sensor data output by the storage unit 312 to the power manager 262 may comprise data indicative of, for example, present operational status, present fault status, present battery health status, present status of electrical connection with the line 302, present state of battery charge (e.g., present battery charge percentage with respect to maximum battery capacity), present battery efficiency, present power output (e.g., real and reactive power) to the line 302, present AC and DC electrical voltage, present AC and DC electrical current, present AC electrical frequency, quantity of charge cycles, present peak load shaving, present load applied to the engine of the generator units 310, present temperature of the battery and/or the inverter. The control data output by the power manager 262 to the storage unit 312 may comprise data indicative of, for example, intended operational status, intended status of electrical connection with the line 302, intended battery charge, intended battery efficiency, intended power output to the line 302, intended AC and DC electrical voltage, intended AC and DC electrical current, intended AC electrical frequency, intended quantity of charge cycles, intended peak load shaving, and intended load to be applied to the engine of the generator units 310.

The storage unit 312 may be selectively electrically connected to the generator units 310 via the line 302, such as may permit the storage unit 312 to be selectively operated by the power manager 262 to receive and store the electrical power output to the line 302 by the generator units 310. The storage unit 312 may be electrically connected to the generator units 310 in parallel, such that the storage unit 312 operates or appears as a load to the generator units 310 when the storage unit 312 is storing electrical power output by the generator units 310. Utilization of the storage unit 312 as a load can facilitate a more efficient operation of the engines of the generator units 310. Generator units operating at higher efficiencies have lower fuel consumption, as well as lower emissions at higher engine loads. However, generator units operating at lower efficiencies have higher fuel consumption, as well as higher emissions at low engine loads. Furthermore, generator units turning on and off frequently to match power demand will accelerate wear and tear, leading to an increase in maintenance costs. Thus, if one or more of the generator units 310 are operating at low efficiency caused by low engine load, the storage unit 312 can be operated to a "charge" state to store the electrical energy output by the generator units 310, thereby increasing load on the generator units 310 to cause the generator units 310 to operate at higher efficiency that will result in lower fuel consumption and lower emissions. Furthermore, a temporary increase in power demand may be met by the storage unit 312, without the need to turn on a spare generator unit 310. The storage unit 312 may also be selectively operated by the power manager 262 to output the stored electrical energy at a selected rate to the wellsite equipment 304 via the line 302 to provide electrical power to operate the wellsite equipment 304 as described herein. The power manager 262 can also receive, analyze, and/or otherwise utilize the digital drilling program 252 to ensure that the storage unit 312 is fully charged to facilitate optimal distribution and utilization of electrical energy output by the energy storage unit 312 and the generator units 310.

The produced gas source 316 may be operable to store and/or selectively discharge or output produced gas into an air intake of the engine of each of the generator units 310 via a corresponding fluid conduit 317. The produced gas may be or comprise hydrocarbon gas (e.g., natural gas, methane, propane, butane, and/or other combustible gas entrained in the drilling fluid) extracted from the drilling fluid flowing out of the wellbore during drilling operations. For example, the produced gas may be separated from the drilling fluid by liquid gas separators (e.g., liquid gas separators 171 shown in FIG. 1) and/or degassers, and transferred to the produced gas source 316 via a fluid conduit, instead of being transferred to a flare stack to be burned. The produced gas source 316 may be or comprise a container (e.g., a tank or piping) of the produced gas, which can be selectively discharged and injected into the engines of the generator units 310. The produced gas may be the sole fuel injected into the engines, or the produced gas may be injected into the engines as part of a mixture comprising air, oxygen gas, gasoline, and/or diesel fuel. The produced gas source 316 may operate in an "on demand" mode of operation, during which the produced gas is injected into the engines while the generator units 310 are running at the rate the produced gas is produced from the wellbore. The produced gas may also be stored within the produced gas source 316 to permit regulated injection of the produced gas into the engines. Flow rate of the produced gas into the engines may be regulated via remotely operated fluid flow control valves communicatively connected with the central controller 192. The total amount of produced gas injected, and the times during which injection occurs, may be determined based on sensor data output by the exhaust sensors 320 and/or based on control data output by a local controller (e.g., an onboard engine controller) of each generator unit 310. By combining the dual feedback sources, the power manager 262 can optimize the performance of the generator units 310 based on total output power performance and/or based on exhaust emissions discharged by the generator units 310 measured by the exhaust sensors 320.

The PS system 300 may further comprise a kW/kVAR (real power/reactive power) transducer or other sensor 332 electrically connected to or along the line 302. The sensor 332 may output sensor data indicative of various electrical properties (e.g., voltage, current, real power electrical, reactive electrical power, apparent electrical power, etc.) of the electrical power demand of the wellsite equipment 304 of the well construction system 100 via the line 302. The sensor 332 may be communicatively connected with the central controller 192, thereby permitting the power manager 262 to receive and process the sensor data, and thus monitor or measure the electrical properties of the electrical power available to the wellsite equipment 304 based on the received sensor data and other data. The power manager 262 may then output control data to various portions of the PS system 300 (e.g., the generator units 310 and/or the storage unit 312) to control the PS system 300 based on the total electrical power demand, including to control generation and distribution of electrical power to the line 302 by the electrical power sources 310, 312. The power manager 262 may control generation and distribution of electrical power to the line 302 by the electrical power sources 310, 312 based on the most efficient sources of power available, taking into consideration directive to reduce total fuel consumption, equipment wear and tear, and emissions into the local environment.

Figure 4:
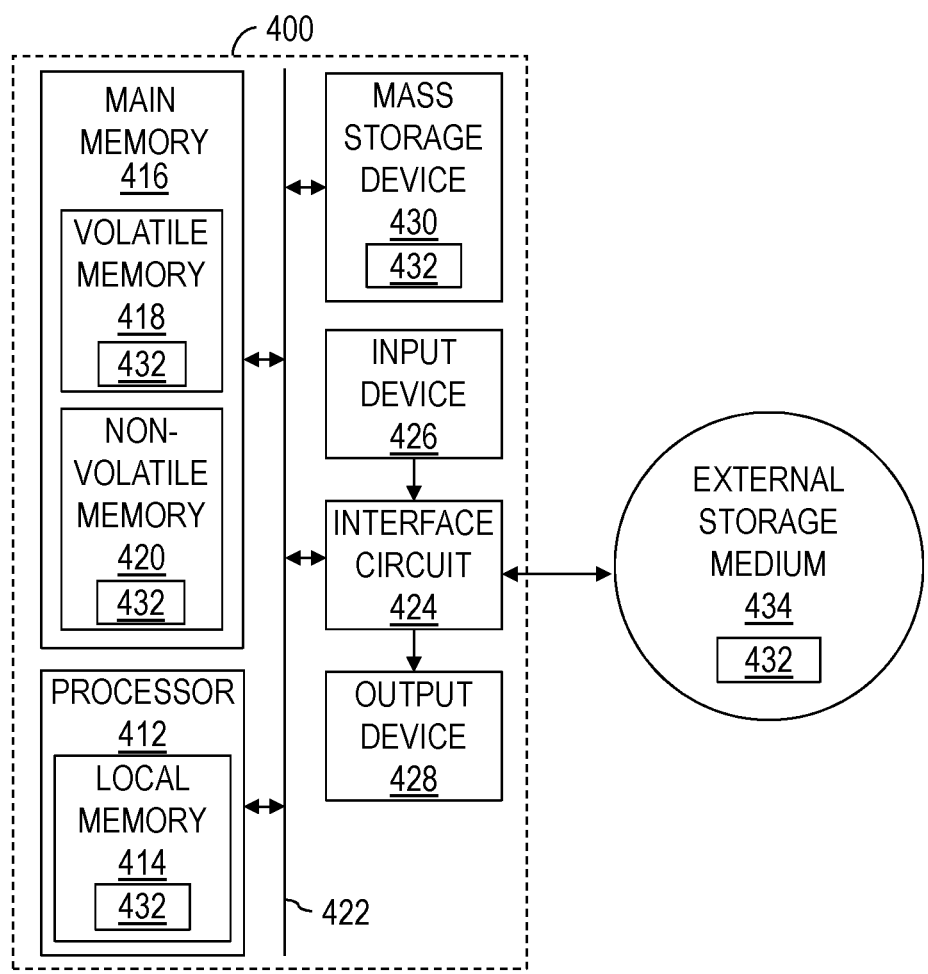
FIG. 4 is a schematic view of at least a portion of an example implementation of apparatus according to one or more aspects of the present disclosure.

FIG. 4 is a schematic view of at least a portion of an example implementation of a processing device 400 (or system) according to one or more aspects of the present disclosure. The processing device 400 may be or form at least a portion of one or more equipment controllers and/or other electronic devices shown in one or more of the FIGS. 1-3. Accordingly, the following description refers to FIGS. 1-4, collectively.

The processing device 400 may be or comprise, for example, one or more processors, controllers, special-purpose computing devices, PCs (e.g., desktop, laptop, tablet computers, etc.), personal digital assistants, smartphones, IPCs, PLCs, servers, internet appliances, and/or other types of computing devices. The processing device 400 may be or form at least a portion of the rig control system 200, including the central controller 192, the local controllers 221-228, and the control workstations 197, 210. Although it is possible that the entirety of the processing device 400 is implemented within one device, it is also contemplated that one or more components or functions of the processing device 400 may be implemented across multiple devices, some or an entirety of which may be at the wellsite and/or remote from the wellsite.

The processing device 400 may comprise a processor 412, such as a general-purpose programmable processor. The processor 412 may comprise a local memory 414, and may execute machine-readable and executable program code instructions 432 (i.e., computer program code) present in the local memory 414 and/or another memory device. The processor 412 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 412 include one or more INTEL microprocessors, microcontrollers from the ARM and/or PICO families of microcontrollers, embedded soft/hard processors in one or more FPGAs.

The processor 412 may execute, among other things, the program code instructions 432 and/or other instructions and/or programs to implement the example methods and/or operations described herein. For example, the program code instructions 432, when executed by the processor 412 of the processing device 400, may cause the processor 412 to receive and process (e.g., compare) sensor data (e.g., sensor measurements). The program code instructions 432, when executed by the processor 412 of the processing device 400, may also or instead output control data (i.e., control commands) to cause one or more portions or pieces of well construction equipment of a well construction system to perform the example methods and/or operations described herein.

The processor 412 may be in communication with a main memory 416, such as may include a volatile memory 418 and a non-volatile memory 420, perhaps via a bus 422 and/or other communication means. The volatile memory 418 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by read-only memory, flash memory, and/or other types of memory devices. One or more memory controllers (not shown) may control access to the volatile memory 418 and/or non-volatile memory 420.

The processing device 400 may also comprise an interface circuit 424, which is in communication with the processor 412, such as via the bus 422. The interface circuit 424 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 424 may comprise a graphics driver card. The interface circuit 424 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 400 may be in communication with various sensors, video cameras, actuators, processing devices, equipment controllers, and other devices of the well construction system via the interface circuit 424. The interface circuit 424 can facilitate communications between the processing device 400 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 426 may also be connected to the interface circuit 424. The input devices 426 may permit rig personnel to enter the program code instructions 432, which may be or comprise control data, operational parameters, operational set-points, a digital drilling program, and/or a database of well construction operations. The program code instructions 432 may further comprise modeling or predictive routines, equations, algorithms, processes, applications, and/or other programs operable to perform example methods and/or operations described herein. The input devices 426 may be, comprise, or be implemented by a keyboard, a mouse, a joystick, a touchscreen, a track-pad, a trackball, an isopoint, and/or a voice recognition system, among other examples. One or more output devices 428 may also be connected to the interface circuit 424. The output devices 428 may permit for visualization or other sensory perception of various data, such as sensor data, status data, and/or other example data. The output devices 428 may be, comprise, or be implemented by video output devices (e.g., an LCD, an LED display, a CRT display, a touchscreen, etc.), printers, and/or speakers, among other examples. The one or more input devices 426 and the one or more output devices 428 connected to the interface circuit 424 may, at least in part, facilitate the HMIs described herein.

The processing device 400 may comprise a mass storage device 430 for storing data and program code instructions 432. The mass storage device 430 may be connected to the processor 412, such as via the bus 422. The mass storage device 430 may be or comprise a tangible, non-transitory storage medium, such as a floppy disk drive, a hard disk drive, a compact disk (CD) drive, and/or digital versatile disk (DVD) drive, among other examples. The processing device 400 may be communicatively connected with an external storage medium 434 via the interface circuit 424. The external storage medium 434 may be or comprise a removable storage medium (e.g., a CD or DVD), such as may be operable to store data and program code instructions 432.

As described above, the program code instructions 432 may be stored in the mass storage device 430, the main memory 416, the local memory 414, and/or the removable storage medium 434. Thus, the processing device 400 may be implemented in accordance with hardware (perhaps implemented in one or more chips including an integrated circuit, such as an ASIC), or may be implemented as software or firmware for execution by the processor 412. In the case of firmware or software, the implementation may be provided as a computer program product including a non-transitory, computer-readable medium or storage structure embodying computer program code instructions 432 (i.e., software or firmware) thereon for execution by the processor 412. The program code instructions 432 may include program instructions or computer program code that, when executed by the processor 412, may perform and/or cause performance of example methods, processes, and/or operations described herein.

The present disclosure is further directed to example methods (e.g., operations and/or processes) of performing well construction operations described herein. The methods may be performed by utilizing or otherwise in conjunction with at least a portion of one or more implementations of one or more instances of the apparatus shown in one or more of FIGS. 1-4, and/or otherwise within the scope of the present disclosure. The methods may be caused to be performed, at least partially, by a processing device, such as the processing device 400 executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be caused to be performed, at least partially, by a human operator (e.g., rig personnel) utilizing one or more instances of the apparatus shown in one or more of FIGS. 1-4, and/or otherwise within the scope of the present disclosure. The following description of example methods refer to apparatus shown in one or more of FIGS. 1-4, however, the methods may also be performed in conjunction with implementations of apparatus other than those depicted in FIGS. 1-4 that are also within the scope of the present disclosure.

During well construction operations, electrical power demand changes frequently and significantly during different stages of the well construction operations. For example, electrical power demand may be relatively high during actual drilling, when the top drive 116 rotates the drill string 120 and the mud pumps 144 are circulating drilling fluid into the wellbore 102 via the drill string 120. Such electrical power demand may increase while the total or true vertical depth of the wellbore 102 increases. Electrical power demand may be relatively low during make-up operations, when the iron roughneck 165 is operating and the top drive 116 is not rotating the drill string 120 and the mud pumps 144 are not circulating the drilling fluid. The electrical power demand may suddenly increase to relatively high levels during tripping operations, when the drawworks 118 lifts the drill string 120 upward. Electrical power demand may be relatively low during break out operations, when the iron roughneck 165 is operating to disconnect each subsequent tubular joint and the drawworks 118 is not lifting the drill string 120 upward. Electrical power demand may also progressively decrease during tripping operations while the total length of the drill string 120 decreases after each tubular joint is disconnected from the drill string 120. Electrical power demand changes significantly during transitions between actual drilling operations and make-up operations, and during transitions between tripping operations and break out operations. For example, during a spudding stage of the well construction operations, electrical power demand may range between about 0.4 megawatt and about 0.6 megawatt. During connection (e.g., make-up or break out) operations, electrical power demand may range between about 0.3 megawatt and about 0.7 megawatt. During tripping operations, electrical power demand may range between about 0.3 megawatt and about 1.5 megawatt. During actual drilling operations, electrical power demand may range between about 2.0 megawatt and about 3.0 megawatt.

Generally, when electrical power demand changes during the well construction operations, fuel efficiency and rate of exhaust emission discharge of the generator units also change. As described above, efficiency of a generator unit increases when load on its engine increases. Fuel efficiency of a generator unit may be optimal at engine loads ranging between, for example, about 50% and about 100%. However, during well construction operations, generator units collectively output electrical power to match electrical power demands of the well construction equipment, regardless of efficiency. Thus, during stages of well construction operations requiring relatively low levels of electrical power, the generator units may collectively operate at a low efficiency. Efficiency of a generator unit is also relatively low during engine warm-up period, which may take several minutes. However, during stages of well construction operations requiring a relatively high level of electrical power, one or more additional generator units may be quickly brought online (i.e., activated) to provide additional electrical power, without permitting the additional generator units to properly warm up. While operating at low efficiency or before a proper warm-up, generator units discharge exhaust emissions and unburnt fuel at a relatively higher rate.

Accordingly, the present disclosure is directed to methods for monitoring and controlling collective operations of the electrical power sources 310, 312 of the PS system 300 at the wellsite 104 to optimize collective operation of such electrical power sources 310, 312 to optimize well construction operations at the wellsite 104. Operations of the PS system 300 may be managed (i.e., controlled) automatically by the power manager 262 (and the control process 250) of the central controller 192 to provide electrical power to the wellsite equipment 304 to perform the well construction operations, while increasing efficiency of the PS system 300, reducing use of nonrenewable energy sources (e.g., diesel fuel, natural gas, and/or other fossil fuels), reducing rate of discharge of exhaust emissions, and reducing operating and maintenance costs.

The power manager 262 may be operable to automatically monitor and control collective operations of the electrical power sources 310, 312 and the produced gas source 316 based on the digital drilling program 252 comprising information indicative of planned well construction operations uploaded or saved to the central controller 192. The digital drilling program 252 may comprise an equipment operational plan indicative of upcoming planned well construction operations to be performed by the wellsite equipment 304. The digital drilling program 252 may also comprise an electrical power plan comprising information indicative of electrical power demand (i.e., requirements) for performing each planned well construction operation. The electrical power plan may also comprise information indicative of electrical power output (i.e., supply) capacity of each power source of the PS system 300. The power manager 262 may be operable to automatically monitor and control the collective operations of the electrical power sources 310, 312 and the produced gas source 316 based further on the actual (e.g., measured) level of electrical power demand (i.e., load demand) of the wellsite equipment 304 and/or the actual (e.g., measured) level of electrical power output capacity of the electrical power sources 310, 312 that is available to the wellsite equipment 304. Thus, the power manager 262 may be operable to monitor and control operations (e.g., start/stop and engine load percentage) of the generator units 310 based on the actual electrical power demand (i.e., load demand) of the wellsite equipment 304 and the actual electrical power output capacity that is available from the electrical power sources 310, 312. The power manager 262 may be further operable to monitor and control operations of the electrical power sources 310, 312 and the produced gas source 316 based further on detected abnormal events at, and/or operational states of, the well construction system 100.

The power manager 262 may be aware of times and levels of electrical power demand and/or output capacity for each well construction operation before each such operation begins, such as based on the digital drilling program 252. The power manager 262 may automatically manage operations of the PS system 300, based on the digital drilling program 252, to cause the PS system 300 to provide electrical power to the wellsite equipment 304 to perform the well construction operations, while increasing efficiency of the PS system 300, reducing use of nonrenewable energy sources (e.g., diesel fuel, natural gas, and/or other fossil fuels), reducing rate of discharge of exhaust emissions, and reducing operating and maintenance costs. For example, during times (e.g., stages or periods) of lower peak electrical power demand (e.g., below about 1.0 megawatt) during which the well construction operations require relatively low levels of electrical power, the power manager 262 may turn off one or more of the generator units 310, thereby causing the remaining generator units 310 to increase their electrical power output to meet the electrical power demand and thus operate at higher efficiency. During times of lower average electrical power demand of the wellsite equipment 304, the power manager 262 may also or instead maintain each generator unit 310 as operational or turn off a lesser number of the generator units 310 while simultaneously establishing an electrical connection between one or more of the operating generator units 310 and the storage unit 312 to charge the storage unit 312 while the generator units 310 continue to provide electrical power to the wellsite equipment 304. Also, during a period when some planned operations may cause the power demand to temporarily exceed the existing available power, the power manager 262 may adjust the planned operation parameters to reduce the power demand, thus avoiding the need to bring on another generator unit 310 online, thereby reducing wear and tear on the generator unit 310.

The power manager 262 may be operable to turn on or turn off one or more of the generator units 310 and/or charge the storage unit 312 based on the equipment operational plan contained in the digital drilling program 252. For example, during times of lower average electrical power demand, the power manager 262 may cause one or more of the generator units 310 to output electrical power, and may cause the storage unit 312 to receive and store the electrical power. Charging of the storage unit 312 increases the load on each operating generator unit 310, thereby causing each operating generator unit 310 to operate at a high efficiency. Operating each generator unit 310 at higher efficiency reduces the amount of fuel consumed by each generator unit 310 per unit of electrical power produced.

If the storage unit 312 becomes charged to a predetermined level (e.g., between about 65% and about 100%) before the time of lower average electrical power demand of the wellsite equipment 304 is over, then the power manager 262 may turn off one or more of the generator units 310, such as may permit the remaining operating generator units 310 to continue to operate at high efficiency. However, if the storage unit 312 becomes charged to a predetermined level while the average electrical power demand of the wellsite equipment 304 is relatively low (e.g., below about 400 kilowatts), then the power manager 262 may turn off additional generator units 310 and cause the storage unit 312 to supply electrical power to the wellsite equipment 304. For example, during drill string tripping operations, the average electrical power demand may be about 460 kilowatts and the peak intermittent electrical power demand may be about 1.5 megawatts. During such drill string tripping operations, the power manager 262 may operate the storage unit 312 and just one generator unit 310 capable of generating about 1.0 megawatt to collectively supply electrical power to the wellsite equipment 304 (e.g., the drawworks 118) to facilitate the drill string tripping operations. For example, the power manager 262 may cause the generator unit 310 and the storage unit 312 to collectively supply electrical power to the wellsite equipment 304 when the drill string 120 is being lifted. However, during break out operations, the power manager 262 may cause some of the electrical power from the generator unit 310 to supply electrical power to other wellsite equipment 304 (e.g., the iron roughneck 165 and other auxiliary devices), and may cause some of the electrical power to be stored by the storage unit 312, thereby retaining a high load on the generator unit 310 while continually charging and discharging the storage unit 312. The power manager 262 may turn on one or more of the generator units 310 when the storage unit 312 becomes discharged or when the average electrical power demand of the wellsite equipment 304 increases. Such operations of the generator units 310 and the storage unit 312 may be caused by the power manager 262 based on the digital drilling program 252, as well as the state of the storage unit 312.

The power manager 262 may be further operable to optimize an electrical power limit process (i.e., anti-blackout process). For example, the power manager 262 may be operable to change or otherwise control operation of the PS system 300 before the electrical power demand of the wellsite equipment 304 exceeds available power from the electrical power sources 310, 312. Such operation may prevent overload of the line 302 or other electrical circuitry of the well construction system 100, and thus prevent an electrical power blackout.

Hence, when the power manager 262 determines, based on the digital drilling program 252, that a planned well construction operation associated with a lower average or intermittent power demand will be occurring in the near future, then the power manager 262 may turn off a generator unit 310 or start charging the storage unit 312 to increase load on the generator units 310 at substantially the same time as the period of lower power demand starts, because such time is indicated in the digital drilling program 252. Conversely, when the power manager 262 determines that a planned well construction operation associated with a higher average or intermittent power demand will be occurring in the near future, and if the power manager 262 determines that the available storage energy will not be able to meet such demand, the power manager 262 may then turn on a generator unit 310 a predetermined amount of time (e.g., a few minutes) before the period of higher power demand starts, permitting the generator unit 310 to properly warm-up. The starting time of the period of higher power demand is known because such time is indicated in the digital drilling program 252. Furthermore, when the power manager 262 determines that a period of higher average or intermittent power demand is about to start in the near future, then the power manager 262 may cause the storage unit 312 to stop charging and output electrical power to the line 302 at substantially the same time that the period of higher power demand starts.

Additionally, when the power manager 262 determines that a time period of intermittent higher power demand, but relatively low average power demand (e.g., the drill string tripping operations), will be occurring in the near future, the power manager 262 may cause the storage unit 312 to store electrical power to meet such electrical power demand. For example, the power manager 262 may cause the storage unit 312 to increase the electrical load of presently operating generator units 310, and/or the power manager may turn on an additional generator unit 310, whereby electrical power generated in excess of present electrical power demand can be stored by the storage unit 312 for use during a time period of intermittent high power demand. When the high power demand period is over, the power manager 262 may operate or utilize the energy storage unit 312 as a load to help maintain a more steady-state power load demand on the generator units 310. With sufficient power storage capacity of the storage unit 312, intermittent higher power demand over an operational period may be fully satisfied with the combination of the storage unit 312 and a small number of generator units 310 running, without the need to bring additional generator units 310 online.

The power manager 262 may also or instead cause the storage unit 312 output more electrical power to the line 302 when the generator units 310 are about to experience and/or are experiencing a high transient load (i.e., heavy block load or unload) based on the digital drilling program 252. A high transient load can cause the engine of the generator unit 310 to significantly increase power output to accelerate the electric generator of the generator unit 310 to ramp up electrical power output, such as based on sensor data from the transducer 332. During such high transient load, fuel is injected into the engine and burned at relatively high rates, resulting in relatively high output rates of exhaust emissions and unburnt fuel. During such high transient load, the engine and various other mechanical components (e.g., gears, shafts, belts, etc.) of a generator unit 310 experience high rate of wear caused by high levels and/or sudden changes in torque, backlash, and impacts experienced during high rates of acceleration of the engine. High rates of engine acceleration can also result in overshoot of engine speed and electrical power output, requiring the engine to slow down to a steady-state speed associated with the intended electrical power output, which causes further engine wear and decrease in efficiency. Likewise, during high transient unloading of the generator unit 310, the engine power output is suddenly decreased (e.g., by reducing fuel flow) to decelerate the engine, thereby permitting the speed of the generator unit 310 to decrease. Such repetitive heavy loading and unloading of the generator units 310 causes high rates of mechanical wear to the generator units 310. Therefore, during a high transient load, the power manager 262 may cause the storage unit 312 to output more electrical power to the line 302, such that the generator units 310 experience a gradual increase in load (i.e., a soft load). The power manager 262 may cause the storage unit 312 to output more electrical power to the line 302 before or substantially at the same time that the generator units 310 are experiencing the high transient load, based on the digital drilling program 252. Outputting more electrical power into the line 302 by the storage unit 312 reduces the rate of load increase (i.e., soft-loading) to the generator units 310, causing the generator units 310 to ramp up output of electrical power slowly, thereby burning less fuel and reducing output rates of exhaust emissions and unburnt fuel. Soft-loading the generator units 310 prevents or inhibits high acceleration rates and overshooting of speed and electrical power production, thereby reducing rates of mechanical wear of the generator units 310.

Figure 5:
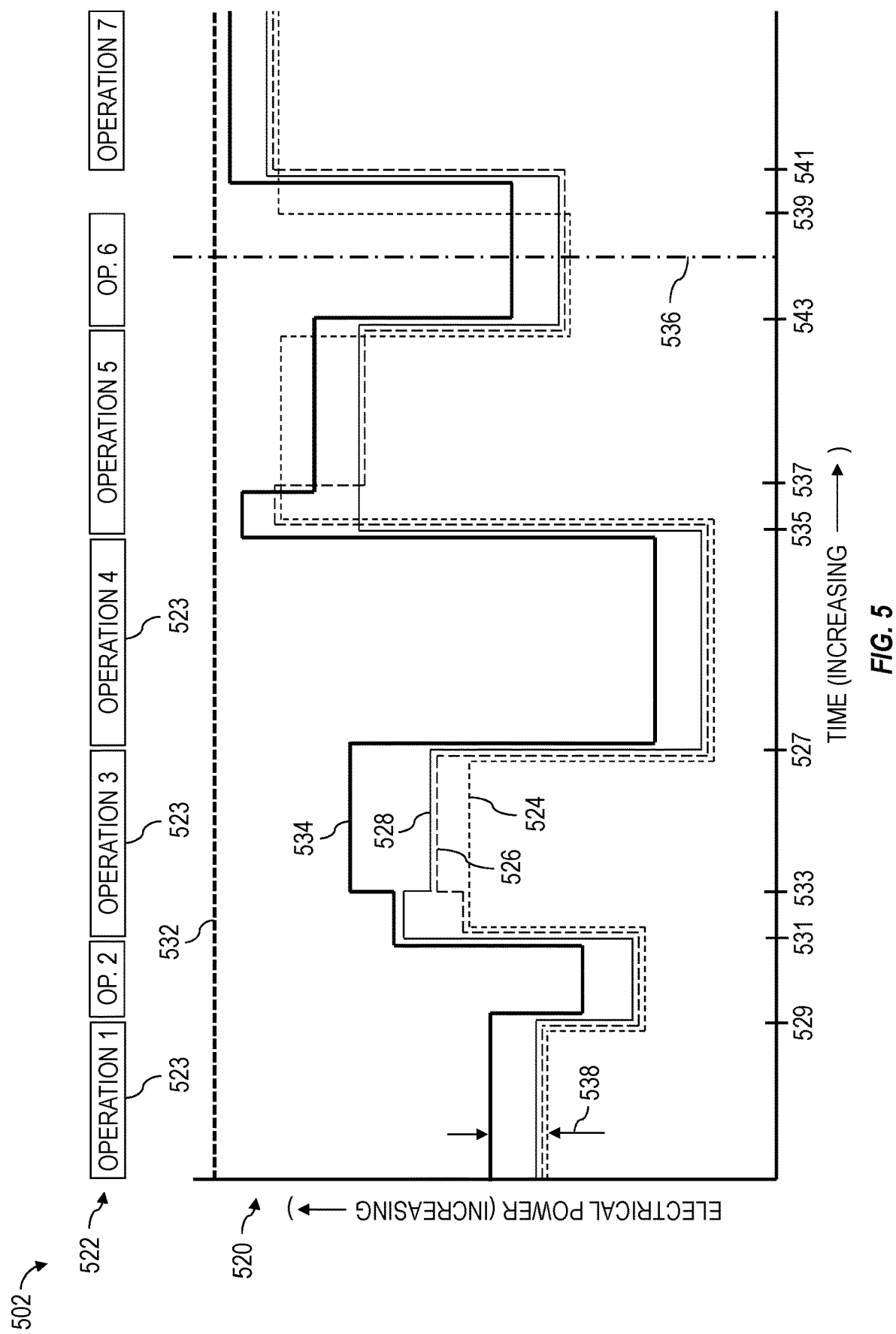
FIGS. 5 and 6 are example implementations of screens displayed by the apparatus shown in one or more of FIGS. 1 and 2 according to one or more aspects of the present disclosure.
Figure 6:
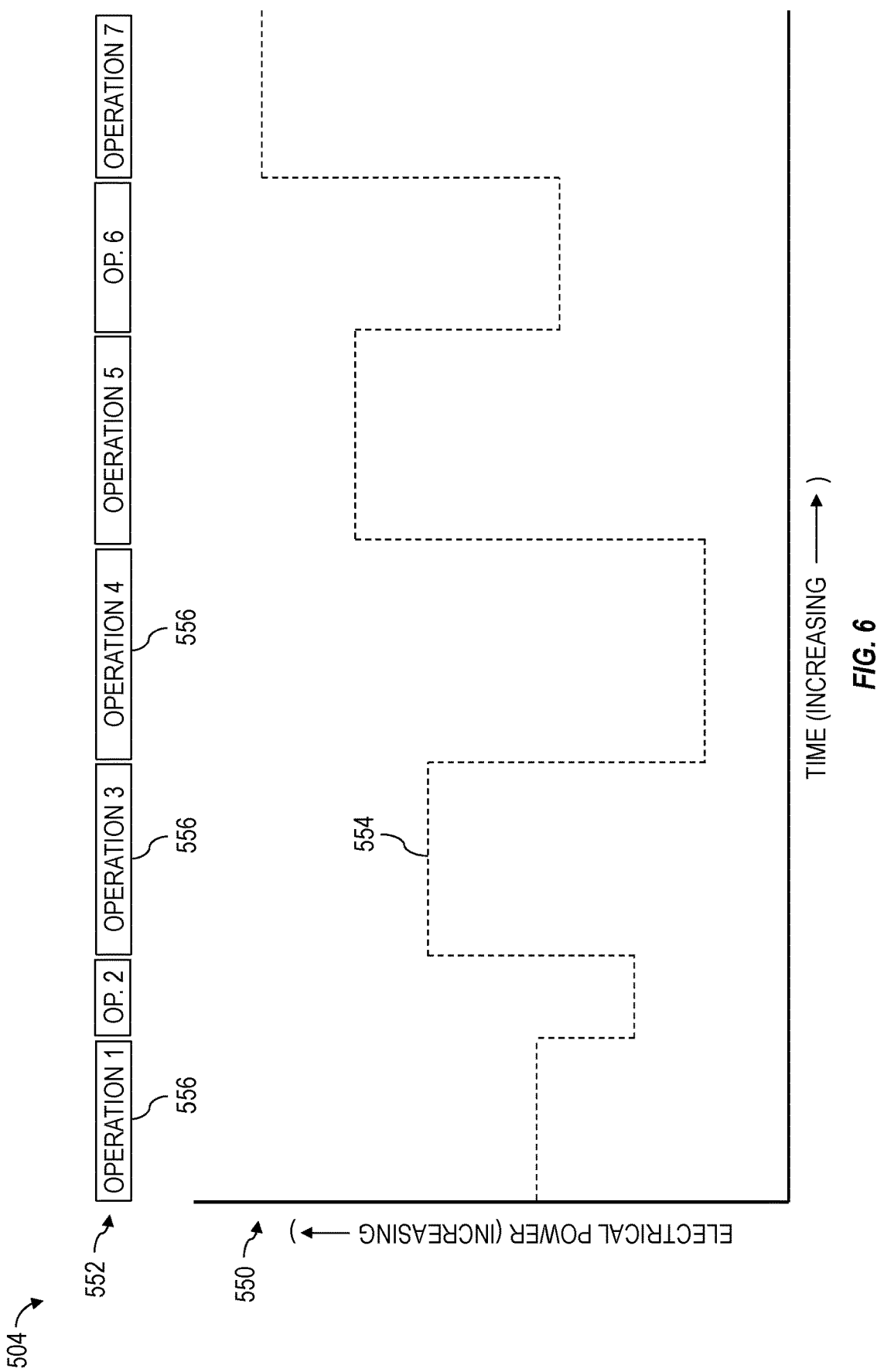

An example method according to one or more aspects of the present disclosure may comprise generating or otherwise displaying one or more display screens on a video output device of the control workstations 190, 210 for viewing by rig personnel, thus permitting the rig personnel to monitor, configure, and control well construction equipment of the well construction system 100. FIGS. 5 and 6 are example implementations of display screens 502, 504, respectively, generated by a processing device, such as the central controller 192 shown in FIGS. 1-3 or the processing device 400 shown in FIG. 4, based on sensor data output by the sensors 231-238 and processes executed by the central controller 192, including the power manager 262. The display screens 502, 504 may be displayed on a video output device of one or more of the workstations 190, 210 for viewing by the rig personnel, thereby permitting the rig personnel to monitor, configure, and control the wellsite equipment 304 and/or the PS system 300. Accordingly, the following description refers to FIGS. 1-6, collectively.

The display screen 502 may show or comprise a graph 520 indicative of at least a portion of an electrical power plan of a digital drilling program 252 for performing the well construction operations to construct a well 102. The graph 520 may indicate electrical power (e.g., in megawatts) along the vertical axis, and time along the horizontal axis. The display screen 502 may also show or comprise a timeline 522 (e.g., text, windows, visual indicators, etc.) indicative of at least a portion of an equipment operational plan of the digital drilling program 252. The timeline 522 may comprise text and/or other indicators describing or otherwise identifying successive planned well construction operations 523 (e.g., operational sequences, tasks, mechanical actions, etc.). The graph 520 and the timeline 522 may be generated or otherwise output by a processing device, such as the processing device 400, based on information output by the power manager 262 and/or other processes of the central controller 192.

The electrical power plan shown on the graph 520 may comprise a profile (or curve) 524 indicative of a level or quantity of planned (e.g., projected, estimated, expected, etc.) electrical power demand of the wellsite equipment 304 to perform the planned well construction operations 523 to be performed by the wellsite equipment 304 as part of well construction operations 523 to construct the well 102. The graph 520 may also comprise a profile (or curve) 526 indicative of a level or quantity of adjusted (i.e., changed) planned electrical power demand of the wellsite equipment 304 to perform the planned well construction operations 523 to be performed by the wellsite equipment 304 to construct the well 102. The adjusted planned electrical power demand 526 may be or comprise the planned electrical power demand 524 that is adjusted by the power manager 262 based on changing operational parameters described below. The graph 520 may further comprise a profile (or curve) 528 indicative of a level or quantity of the actual (e.g., measured) electrical power demand of the wellsite equipment 304 during the performance of the planned well construction operations 523. The actual electrical power demand 528 may be determined by the power manager 262 based on electrical power measurements output by one or more electrical sensors, such as the sensor 332.

The electrical power plan shown on the graph 520 may also comprise a profile (or curve) 532 indicative of a maximum electrical power output capacity of the PS system 300. The maximum power output capacity 532 may be or comprise the maximum level or amount of electrical power (i.e., maximum available electrical power limit or ceiling) that the PS system 300 can output to the wellsite equipment 304 to perform the planned well construction operations 523 indicated in the equipment operational plan when each of the generator units 310 is online and the storage unit 312 is fully charged. Although the maximum power output capacity 532 is shown as a straight horizontal profile, the maximum power output capacity 532 of the PS system 300 may not be constant, but may vary with time depending on the condition of the generator units 310 and/or the storage unit 312. The electrical power plan shown on the graph 520 may also comprise a profile (or curve) 534 indicative of a maximum instantaneous electrical power output capacity of the PS system 300. The maximum instantaneous electrical power output capacity 534 may be or comprise the maximum level or amount of electrical power (i.e., maximum instantaneously available electrical power limit or ceiling) that the PS system 300 can instantaneously output to the wellsite equipment 304 from the generator units 310 that are currently online and the storage unit 312 as currently charged to perform the planned well construction operations 523 indicated in the equipment operational plan.

A present time indicator 536 (e.g., a line or window) may be displayed along or in association with the profiles 524, 526, 528, 532, 534, the timeline 522, and the horizontal time axis. The present time indicator 536 may indicate the present time with respect to the performance of the equipment operational plan and the electrical power plan of the digital drilling program 252. During well construction operations, the present time indicator 536 may move to the right on the display screen 502 with respect to the profiles 524, 526, 528, 532, 534, the timeline 522, and the horizontal time axis to indicate the progression of time. The present time indicator 536 may instead be fixed on the display screen 502 and the profiles 524, 526, 528, 532, 534, the timeline 522, and the horizontal time axis may move (scroll) to the left with respect to the present time indicator 536 to indicate the progression of time.

The display screen 502 may be displayed to and analyzed by rig personnel to determine operational status of the wellsite equipment 304 and PS system 300 with respect to various parameters of electrical power (e.g., as indicated by one or more of the profiles 524, 526, 528, 532, 534) that is being and will be supplied to the wellsite equipment 304 by the PS system 300 to perform the planned well construction operations 523. For example, each planned well construction operation 523 may be displayed in association with (e.g., above) a corresponding portion of the planned electrical power demand 524, the adjusted planned electrical power demand 526, the actual electrical power demand 528, and the maximum instantaneous power output capacity 534. The graph 520 and the timeline 522 may collectively indicate the level of electrical power demand 524, 526, 528 of the wellsite equipment 304 to perform each planned well construction operation 523 with respect to the electrical power output capacities 532, 534 of the wellsite equipment 304. The graph 520 and the timeline 522 may thus collectively indicate to rig personnel if the electrical power capacities 532, 534 are sufficient to meet the electrical power demand 524, 526, 528 of the wellsite equipment 304 during performance of the planned well construction operations 523.

The power manager 262 may be operable to cause the PS system 300 to output the electrical power to the wellsite equipment 304 based on the electrical power plan, such that the electrical power output by the PS system 300 meets the electrical power demand 524, 526, 528 of the wellsite equipment 304 to perform the planned well construction operations 523. The maximum instantaneous power output capacity 534 may be set to exceed the planned electrical power demand 524 of the wellsite equipment 304 by a predetermined amount 538 (e.g., a safety margin). Thus, the display screen 502 may display spare electrical power capacity of the PS system 300 to permit the rig personnel (e.g., maintenance supervisors) to schedule, delay, or otherwise manage unplanned rig activities (e.g., maintenance activities). For example, the rig personnel may compare the maximum instantaneous power output capacity 534 to the planned and/or actual electrical power demands 524, 528 or compare the maximum power output capacity 532 to the planned and/or actual electrical power demands 524, 528 such as to determine if sufficient excess electrical power exists or will exist to perform the unplanned rig activities. The display screen 502 may also provide advance warning for or otherwise determine when the planned electrical power demand 524 will exceed one or both of the maximum power output capacities 532, 534.

As shown on the display screen 502, the power manager 262 may cause the PS system 300 (e.g., the generator units 310 and/or the electrical energy storage 312) to output an amount of electrical power that is sufficient to satisfy the planned electrical power demand 524 indicated in the electrical power plan of the digital drilling program 252 to perform the planned well construction operations 523 indicated in the equipment operational plan of the digital drilling program 252. The power manager 262 may cause the PS system 300 to supply the maximum instantaneous power output capacity 534 based on the electrical power plan of the digital drilling program 252. In other words, the power manager 262 can cause the PS system 300 to output electrical power based on the planned electrical power demand 524. The power manager 262 may also cause the PS system 300 to output an amount of electrical power that exceeds the planned electrical power demand 524 by the safety margin 538.

For example, during the relatively low electrical power demand of the wellsite equipment 304 to perform "Operation 2" of the planned well construction operations 523, between time 529 and time 531, the power manager 262 may lower the maximum instantaneous power output capacity 534 to meet the planned electrical power demand 524 of the wellsite equipment 304 to perform such operation while maintaining the safety margin 538. Similarly, during the relatively low electrical power demand of the wellsite equipment 304 to perform "Operation 4" of the planned well construction operations 523, between time 527 and time 535, the power manager 262 may lower the maximum instantaneous power output capacity 534 to meet the planned electrical power demand 524 of the wellsite equipment 304 to perform such operation while maintaining the safety margin 538. The power manager 262 may decrease the maximum instantaneous power output capacity 534 between time 529 and time 531 and between time 527 and time 535 by turning off a generator unit 310 (i.e., taking a generator unit 310 offline) and/or by charging the storage unit 312. However, during the relatively high electrical power demand of the wellsite equipment 304 to perform "Operation 3" of the planned well construction operations 523, between time 531 and time 527, the power manager 262 may increase the maximum instantaneous power output capacity 534 to meet the planned electrical power demand 524 of the wellsite equipment 304 to perform such operation while maintaining the safety margin 538. Similarly, during the relatively high electrical power demand of the wellsite equipment 304 to perform "Operation 5" of the planned well construction operations 523, between time 535 and time 543, the power manager 262 may increase the maximum instantaneous power output capacity 534 to meet the planned electrical power demand 524 of the wellsite equipment 304 to perform such operation while maintaining the safety margin 538. The power manager 262 may increase the maximum instantaneous power output capacity 534 between time 531 and time 527 and between time 535 and time 543 by turning on another generator unit 310 (i.e., taking a generator unit 310 online) and/or by discharging the storage unit 312.

Therefore, when the power manager 262 determines, based on the planned electrical power demand 524, that the planned well construction "Operation 4" and the planned well construction "Operation 6" associated with a lower average or intermittent planned electrical power demand 524 will be starting at time 527 and time 543, respectively, then the power manager 262 may turn off a generator unit 310 or start charging the storage unit 312 to increase load on the generator units 310 at substantially the same time that such operations start. The starting time 527 of "Operation 4" and the starting time 543 of "Operation 6" are indicated in the planned electrical power demand 524. Conversely, when the power manager 262 determines that the planned well construction "Operation 3" and the planned well construction "Operation 5" associated with a higher average or intermittent planned power demand 524 will be occurring at time 531 and time 535, respectively, and if the power manager 262 determines that the maximum instantaneous power output capacity 534 will not be able to meet such planned power demand 524, the power manager 262 may then turn on a generator unit 310 a predetermined amount of time (e.g., a few minutes) before such operations start, permitting the generator unit 310 to properly warm-up. The starting time 531 of "Operation 3" and the starting time 535 of "Operation 5" are indicated in the planned electrical power demand 524. Furthermore, when the power manager 262 determines that the planned well construction "Operation 3" and the planned well construction "Operation 5" is about to start in the near future, then the power manager 262 may cause the storage unit 312 to stop charging and output electrical power to the line 302 at substantially the same time 531, 535 that such operations start.

The display screen 502 further shows example scenarios during which the power manager 262 adjusts (i.e., changes) the maximum instantaneous power output capacity 534 of the PS system 300 (e.g., the generator units 310 and/or the electrical energy storage 312) based on the actual electrical power demand 528 of the wellsite equipment 304. For example, when the actual electrical power demand 528 approaches or is expected to surpass (i.e., be higher than) the maximum instantaneous power output capacity 534, such as at time 531 during the start of "Operation 3" of the planned well construction operations 523, the power manager 262 may cause the PS system 300 to increase the maximum instantaneous power output capacity 534, as shown at time 533, to meet the actual electrical power demand 528 (with the safety margin 538) of the wellsite equipment 304 and to prevent an electrical power blackout between time 533 and time 527. However, when the actual electrical power demand 528 is lower than the planned electrical power demand 524, such as at time 535 during the start of "Operation 5" of the planned well construction operations 523, the power manager 262 may cause the PS system 300 to decrease the maximum instantaneous power output capacity 534, as shown at time 537, to reduce production of unnecessary electrical power. Thus, if the maximum instantaneous power output capacity 534 is excessive or not sufficient to satisfy the actual electrical power demand 528, the power manager 262 can also cause the PS system 300 to adjust the maximum instantaneous power output capacity 534 based on the actual electrical power demand 528.

The power manager 262 may also be operable compare the actual electrical power demand 528 to the planned electrical power demand 524 and, based on the comparison, adjust the planned electrical power demand 524, resulting in the adjusted planned electrical power demand 526. The power manager 262 may then cause the PS system 300 adjust the maximum instantaneous power output capacity 534 based on the adjusted planned electrical power demand 526. For example, when the actual electrical power demand 528 is higher than the planned electrical power demand 524, such as at time 531 during the start of "Operation 3" of the planned well construction operations 523, the power manager 262 may cause the PS system 300 to increase the planned electrical power demand 524 to the adjusted planned electrical power demand 526, such as at time 533. The power manager 262 may then cause the PS system 300 to increase the maximum instantaneous power output capacity 534, such as shown at time 533, to meet the adjusted planned electrical power demand 526 (with the safety margin 538) of the wellsite equipment 304 to perform "Operation 3" between time 533 and time 527. However, when the actual electrical power demand 528 is lower than the planned electrical power demand 524, such as at time 535 during the start of "Operation 5" of the planned well construction operations 523, the power manager 262 may cause the PS system 300 to decrease the planned electrical power demand 524 to the adjusted planned electrical power demand 526, such as at time 537. The power manager 262 may then cause the PS system 300 to decrease the maximum instantaneous power output capacity 534, such as shown at time 537, to meet the adjusted planned electrical power demand 526 (with the safety margin 538) of the wellsite equipment 304 to perform "Operation 5" between time 537 and time 543.

The power manager 262 and/or another process of the central controller 192 may also be operable to the record the actual electrical power demand 528 of the well site equipment 304 during performance of the planned well construction operations 523 to a database (e.g., the memory device 430 of the processing device 400) containing other actual electrical power demands from other wells and/other portions of the present well 102. The power manager 262 may be further operable to access the database and compare the recorded actual electrical power demands in the database to the present actual electrical power demand 528. Based on the comparison, the power manager 262 may adjust the planned electrical power demand 524 of the electrical power plan to the adjusted planned electrical power demand 526 if the power manager 262 detects a difference between the recorded actual electrical power demands and the present actual electrical power demand 528. If the recorded actual electrical power demands in the database is different from the present actual electrical power demand 528, the planned electrical power demand 524 may have been miscalculated and/or there is a likelihood that the actual electrical power demand 528 will soon change and become similar to one or more of the recorded actual electrical power demands. The power manager 262 may then cause the PS system 300 to output the electrical power to the wellsite equipment 304 based on the adjusted planned electrical power demand 526, such as during "Operation 3" and "Operation 5" of the planned well construction operations 523.

The power manager 262 may be further operable to adjust operation of the wellsite equipment 304 (directly or indirectly via the control process 250) and/or adjust the equipment operational plan of the digital drilling program 252 to perform the planned well construction operations 523 based on the actual electrical power demand 528 of the well site equipment 304 and the maximum instantaneous power output capacity 534 of the PS system 300. For example, the power manager 262 may be operable to adjust operation of the wellsite equipment 304 and/or adjust the equipment operational plan of the digital drilling program 252 when the actual electrical power demand 528 of the wellsite equipment 304 is close to or about to exceed the maximum instantaneous power output capacity 534 of the PS system 300 (e.g., the electric generator units 310 and/or the electrical storage unit 312). Such operation of the power manager 262 may prevent overload of the line 302 or other electrical circuitry of the well construction system 100 and thus prevent an electrical power blackout. Such scenario may happen when an unplanned event takes place at the wellsite. An unplanned event may include, for example, an unforeseen drilling event requiring additional flow rate of drilling fluid or fast withdraw of the drill string 120 from the wellbore 102. An unplanned event may also include an unforeseen breakdown in one or more of the generator units 310 and/or the storage unit 312, requiring such piece of equipment to be taken offline for maintenance.

The power manager 262 may adjust the equipment operational plan of the digital drilling program 252 and/or adjust the operation of the wellsite equipment 304 to lower the actual electrical power demand 528, such as by changing a speed and/or acceleration of one or more components of the wellsite equipment 304 to perform the planned well construction operations 523, by changing pressure generated by one or more components of the wellsite equipment 304 to perform the planned well construction operations 523, and/or by changing a flow rate output by one or more components of the wellsite equipment 304 to perform the planned well construction operations 523. For example, the speed, the acceleration, the pressure, and/or the flow rate of the wellsite equipment 304 component(s) may be decreased to decrease the actual electrical power demand 528 of the well site equipment 304. The power manager 262 may slow down or otherwise adjust operations of selected pieces of the wellsite equipment 304, such as the drawworks 118, the top drive 116, the pumps 144, and various pipe handling equipment collectively operable to move tubulars during the well construction operations, in order to reduce the actual power demand. The power manager 262 may also or instead delay or turn off predetermined operations of the well construction system 100. Thus, the power manager 262 may update, adjust, or delay the planned well construction operations 523 based on a difference between the actual electrical power demand 528 and the maximum instantaneous power output capacity 534, such as to minimize the number of start/stop operations of the generator units 310 and/or to minimize the chance of electrical power blackout. Thus, if the actual electrical power demand 528 is close to the maximum instantaneous power output capacity 534, and the digital drilling program 252 calls for tripping out at a certain speed which could cause a blackout, the power manager 262 may adjust the tripping speed to avoid an electrical blackout.

The power manager 262 may be operable to adjust the operation of the wellsite equipment 304 during the performance of the planned well construction operations 523 based on the actual electrical power demand 528 of the well site equipment 304 and the maximum instantaneous power output capacity 534 of the PS system 300. For example, during the relatively high actual electrical power demand 528 of the wellsite equipment 304 to perform "Operation 3" of the planned well construction operations 523, the power manager 262 may determine at time 533 that the maximum instantaneous power output capacity 534 is close to or not sufficient to meet the actual electrical power demand 528 of the wellsite equipment 304. The power manager 262 may therefore cause the wellsite equipment 304 to decrease its operational speed between time 533 and time 527 to decrease the actual electrical power demand 528 of the wellsite equipment 304, and thereby permit the wellsite equipment 304 to perform the rest of "Operation 3" without causing an electrical blackout. As described above, the power manager 262 may also adjust the planned electrical power demand 524 and cause the PS system 300 to simultaneously increasing the maximum instantaneous power output capacity 534 between time 533 and time 527.

The power manager 262 may also be operable to adjust the equipment operational plan of the digital drilling program 252 during the performance of the planned well construction operations 523 based on the maximum instantaneous power output capacity 534 and the actual electrical power demand 528 of the wellsite equipment 304. The power manager 262 may compare the maximum instantaneous power output capacity 534 to the actual electrical power demand 528 and, based on the comparison, adjust the equipment operational plan of the digital drilling program 252 to lower the actual electrical power demand 528 of the wellsite equipment 304. For example, during the relatively high electrical power demand of the wellsite equipment 304 to perform "Operation 3" of the planned well construction operations 523, the power manager 262 may determine at time 533 that the maximum instantaneous power output capacity 534 is close to or not sufficient to meet the actual electrical power demand 528 of the wellsite equipment 304. The power manager 262 may therefore cause the wellsite equipment 304 to adjust the equipment operational plan for the well site equipment 304 between time 533 and time 527. The adjusted equipment operational plan may cause a corresponding decrease of the actual electrical power demand 528 of the wellsite equipment 304 and thereby permit the wellsite equipment 304 to perform "Operation 3" without causing an electrical blackout.

The power manager 262 may be operable to delay performance of a planned well construction operation 523 based on the planned electrical power demand 524 of the wellsite equipment 304 and the maximum instantaneous power output capacity 534 of the PS system 300. For example, the power manager 262 may determine at time 539 that the maximum instantaneous power output capacity 534 is close to or not sufficient to meet the relatively high planned electrical power demand 524 of the wellsite equipment 304 to perform "Operation 7" of the planned well construction operations 523. The power manager 262 may then adjust the equipment operational plan and/or the electrical power plan of the digital drilling program 252 to delay the operation. The power manager 262 may delay the start of "Operation 7" by the wellsite equipment 304 from time 539 until time 541 and adjust the electrical power plan by changing the planned electrical power demand 524 to the adjusted planned electrical power demand 526, thereby delaying the supply of electrical power to perform "Operation 7" from time 539 to time 541. The time delay may permit the PS system 300 to increase the maximum instantaneous power output capacity 534 to a level that meets the relatively high electrical power demand 524, 526 to perform "Operation 7." For example, the time delay may permit the power manager 262 to bring additional generator units 310 online (e.g., to warm up) and/or to permit the storage unit 312 to switch from a charging mode to a discharging mode.

The power manager 262 may be further operable to determine (e.g., calculate or output) a new electrical power plan indicative of a new planned electrical power demand based on the actual electrical power demand 528. The new electrical power plan may be a part of the digital drilling program for constructing another portion of the same (i.e., present) well, or the new electrical power plan may be a part of another digital drilling program for constructing another well (e.g., an offset well) that is at least partially substantially similar to the present well. For example, the power manager 262 may be operable to the record to the database the actual electrical power demand 528 of the wellsite equipment 304 during performance of the planned well construction operations 523 for a portion of a well or the entire well. After the actual electrical power demand 528 is recorded, determine the new electrical power plan indicative of the new planned electrical power demand of the wellsite equipment 304 to perform a plurality of new planned well construction operations based on the recorded actual electrical power demand 528. Such new planned electrical power demand may be determined for new planned well construction operations that are substantially similar to the planned well construction operations 523 and/or for a well or a portion of a well that is substantially similar to the well associated with the recorded actual electrical power demand 528. Thus, the power manager 262 may learn based on the recorded actual electrical power demand 528 (i.e., electrical power used) to determine the new planned electrical power demand indicated in the new digital drilling program. The power manager 262 may then calibrate and update the new planned electrical power demand in the same or another digital drilling program.

The display screen 504 comprises a graph 550 showing at least a portion of an example new electrical power plan of a digital drilling program for performing well construction operations to construct another portion of the same well or a different well by the wellsite equipment 304. The graph 550 may indicate electrical power (e.g., in megawatts) along the vertical axis, and time along the horizontal axis. The display screen 504 may also show or comprise a timeline 552 (e.g., text, windows, visual indicators) indicative of at least a portion of a new equipment operational plan. The timeline 552 may comprise text or other indicators describing or otherwise identifying successive planned well construction operation 556 (e.g., an operational sequence, a task, a mechanical action, etc.). The planned well construction operations 556 (e.g., operational sequences or tasks) may be substantially similar to the planned well construction operations 523. The graph 550 and the timeline 552 may be generated or otherwise output by a processing device, such as the processing device 400, based on information output by the power manager 262 and/or other processes of the central controller 192.

The new electrical power plan shown on the graph 550 may comprise a new profile 554 (or curve) indicative of level or quantity of planned (e.g., projected, estimated, expected, etc.) electrical power demand of the wellsite equipment 304 to perform the new planned well construction operations 556. The new planned electrical power demand 554 may be similar to the planned electrical power demand 524. However, the new planned electrical power demand 554 reflects the actual electrical power demand 528 measured during the performance of the planned well construction operations 523 shown on the display screen 502 before the power manager 262 adjusted the planned electrical power demand 524, as described above. The similarities between the actual electrical power demand 528 and the new planned electrical power demand 554 may more closely reflect the actual electrical power demand associated with performing the new planned well construction operations 556. Thus, recorded actual electrical power demands may be implemented or otherwise considered when the power manager 262 determines (e.g., calculates or outputs) a new planned electrical power demand.

The power manager 262 may be operable to monitor and control operations of the generator units 310 further based on sensor data output by the exhaust sensors 320 indicative of properties of the exhaust emissions output by the engine of each generator unit 310. For example, if the power manager 262 determines that higher quantities or proportions of particulate material and/or gases are present in the engine exhaust, the power manager 262 may turn off the generator unit 310 or increase load on the generator unit 310 via the storage unit 312.

The power manager 262 may be operable to monitor operations of the generator units 310 and control (e.g., adjust) operation of the produced gas source 316 to optimize operations of the generator units 310 by selectively injecting the produced gas into the engines of the generator units 310. For example, the power manager 262 may cause the produced gas source 316 to inject the produced gas into the engines of the generator units 310 instead of other fuel (e.g., gasoline or diesel fuel), such as when sufficient amount of the produced gas is available and/or to conserve the other fuel. The power manager 262 may instead cause the produced gas source 316 to inject the produced gas into the engines of the generator units 310 on a limited basis, such as when produced gas substantially improves efficiency and/or reduces exhaust emissions.

The power manager 262 may monitor power output by the generator units 310 and change the flow rate of the produced gas into the engines based on the measured power output and/or fuel efficiency. The power manager 262 may maintain the flow rate of the produced gas at a level resulting in the highest or otherwise optimal power output (e.g., when more engine torque is needed) and/or at a level resulting in the highest or otherwise optimal fuel efficiency (e.g., when steady state electrical power output is reached). The power manager 262 may also or instead cause the produced gas source 316 to inject the produced gas into the engine of one or more of the generator units 310 that are about to experience a high transient load based on the equipment operational plan contained in the digital drilling program 252. Injecting produced gas into the engine that is experiencing a high transient load improves burning of the fuel and/or reduces flow rate of fuel into the engine, and thus reduces output rates of exhaust emissions and unburnt fuel.

The power manager 262 may be operable to monitor and control operation of the produced gas source 316 further based on sensor data output by the exhaust sensors 320. For example, the power manager 262 may monitor levels of exhaust emissions within the exhaust of the engines and change the flow rate of produced gas into the engines based on the measured levels of exhaust emissions. When the power manager 262 determines that higher quantities or proportions of exhaust emissions are present in the engine exhaust, the power manager 262 may increase the flow rate of produced gas into the engines to improve burning of the fuel and thus reduce output of the exhaust emissions. The power manager 262 may maintain the flow rate of produced gas at a level resulting in minimal output of the exhaust emissions.

Some of the electric motors of the wellsite equipment 304 electrically powered by the PS system 300 may be or comprise electric motor-generators configured to output electrical power when mechanically driven or actuated by corresponding loads, such as when the electric motor-generators used to slow down or stop movement of the corresponding loads. For example, the electric motor driving the drum of the drawworks 118 may be or comprise an electric motor-generator configured to output electrical power when the electric motor-generator is used to slow down or stop downward movement of the drill string 120, such as during drill string tripping operations. Accordingly, the power manager 262 may be further operable to cause the storage unit 312 to store the electrical power output by the electric motor-generator of the drawworks 118 via the electrical line 302 during predetermined periods of well construction operations 523 (e.g., braking operations) when the electric motor-generator is used to slow down or stop downward movement of the drill string 120. The power manager 262 may also or instead cause the storage unit 312 not to store the electrical power output by the electric motor-generator of the drawworks 118, but cause such electrical power to be used by other wellsite equipment electrically connected to the electrical line 302.

In view of the entirety of the present disclosure, including the figures and the claims, a person having ordinary skill in the art will readily recognize that the present disclosure introduces an apparatus comprising a well construction system comprising: (A) well construction equipment operable to construct a well at a wellsite; (B) a power supply system operable to output electrical power to the well construction equipment to facilitate operation of the well construction equipment; and (C) a control system for controlling the well construction system, wherein the control system comprises a processor and a memory storing a computer program code, and wherein the control system is operable to: (i) store a digital drilling program comprising: (a) an equipment operational plan indicative of planned well construction operations to be performed by the well construction equipment to construct the well; and (b) an electrical power plan indicative of a planned electrical power demand of the well construction equipment to perform the planned well construction operations; and (ii) cause the well construction equipment to perform the planned well construction operations indicated in the equipment operational plan.

The control system may be further operable to cause the power supply system to output the electrical power to the well construction equipment based on the electrical power plan, and the electrical power output by the power supply system may meet the planned electrical power demand of the well construction equipment to perform the planned well construction operations. The electrical power output by the power supply system may exceed the planned electrical power demand of the well construction equipment by a predetermined amount. The electrical power output by the power supply system may also minimize discharge rate of exhaust emissions. The electrical power output by the power supply system may also minimize consumption rate of fuel. The power supply system may comprise a plurality of electric generator units and an electrical energy storage unit, and the control system may be further operable to: cause the electrical energy storage unit to store the electrical power output by the electric generator units; and cause the electric generator units and the electrical energy storage unit to output the electrical power to the well construction equipment based on the electrical power plan, wherein the electrical power output by the electric generator units and the electrical energy storage unit may meet the planned electrical power demand of the well construction equipment to perform the planned well construction operations.

The control system may be operable to: determine an actual electrical power demand of the well construction equipment during the performance of the planned well construction operations; compare the actual electrical power demand to the planned electrical power demand; adjust the planned electrical power demand based on the comparison; and cause the power supply system to output the electrical power to the well construction equipment based on the adjusted planned electrical power demand, wherein the electrical power output by the power supply system may meet the adjusted planned electrical power demand of the well construction equipment to perform the planned well construction operations.

The control system may be operable to: determine an electrical power output capacity indicative of electrical power that the power supply system can output to the well construction equipment to perform the planned well construction operations; compare the electrical power output capacity to the planned electrical power demand; and based on the comparison, adjust the planned well construction operations to adjust the planned electrical power demand. Adjusting the planned well construction operations to adjust the planned electrical power demand may comprise adjusting at least one of a speed of, an acceleration of, a pressure generated by, and a flow rate output by a component of the well construction equipment to perform the planned well construction operations. Adjusting the planned well construction operations to adjust the planned electrical power demand may comprise delaying a start of one or more of the planned well construction operations.

The control system may be operable to: (A) determine an electrical power output capacity indicative of electrical power that the power supply system can output to the well construction equipment to perform the planned well construction operations; and (B) display on a video output device for viewing by personnel: (i) the electrical power output capacity; and (ii) the planned electrical power demand of the well construction equipment to perform the planned well construction operations.

The present disclosure also introduces an apparatus comprising a well construction system comprising: well construction equipment operable to construct a well at a wellsite; a power supply system operable to output electrical power to the well construction equipment to facilitate operation of the well construction equipment; and a control system for controlling the well construction system, wherein the control system comprises a processor and a memory storing a computer program code. The control system is operable to: (A) store a digital drilling program comprising: (i) an equipment operational plan indicative of planned well construction operations to be performed by the well construction equipment to construct the well; and (ii) an electrical power plan indicative of a planned electrical power demand of the well construction equipment to perform the planned well construction operations; (B) cause the well construction equipment to perform the planned well construction operations indicated in the equipment operational plan; (C) cause the power supply system to output the electrical power to the well construction equipment based on the electrical power plan, wherein the electrical power output by the power supply system meets the planned electrical power demand of the well construction equipment to perform the planned well construction operations; (D) determine an electrical power output capacity indicative of electrical power that the power supply system can output to the well construction equipment to perform the planned well construction operations; (E) compare the electrical power output capacity to the planned electrical power demand; and (F) based on the comparison, adjust the planned well construction operations to adjust the planned electrical power demand.

The electrical power output by the power supply system may also minimize discharge rate of exhaust emissions.

The electrical power output by the power supply system may also minimize consumption rate of fuel.

The control system may be operable to: determine an actual electrical power demand of the well construction equipment during the performance of the planned well construction operations; compare the actual electrical power demand to the planned electrical power demand; based on the comparison, adjust the planned electrical power demand of the electrical power plan; and cause the power supply system to output the electrical power to the well construction equipment based on the adjusted planned electrical power demand, wherein the electrical power output by the power supply system may meet the adjusted planned electrical power demand of the well construction equipment to perform the planned well construction operations.

The present disclosure also introduces a method comprising commencing operation of a control system of a well construction system, wherein the well construction system is located at a wellsite and comprises well construction equipment and a power supply system, and wherein the operating control system: (A) stores a digital drilling program comprising: (i) an equipment operational plan indicative of planned well construction operations to be performed by the well construction equipment to construct a well at the wellsite; and (ii) an electrical power plan indicative of a planned electrical power demand of the well construction equipment to perform the planned well construction operations; (B) causes the well construction equipment to perform the planned well construction operations indicated in the equipment operational plan; and (C) causes the power supply system to output the electrical power to the well construction equipment based on the electrical power plan, wherein the electrical power output by the power supply system meets the planned electrical power demand of the well construction equipment to perform the planned well construction operations.

The operating control system may: determine an actual electrical power demand of the well construction equipment during the performance of the planned well construction operations; compare the actual electrical power demand to the planned electrical power demand; adjust the planned electrical power demand of the electrical power plan based on the comparison; and cause the power supply system to output the electrical power to the well construction equipment based on the adjusted planned electrical power demand, wherein the electrical power output by the power supply system may meet the adjusted planned electrical power demand of the well construction equipment to perform the planned well construction operations.

The operating control system may: determine an electrical power output capacity indicative of electrical power that the power supply system can output to the well construction equipment to perform the planned well construction operations; compare the electrical power output capacity to the planned electrical power demand; and based on the comparison, adjust the planned well construction operations to adjust the planned electrical power demand. Adjusting the planned well construction operations to adjust the planned electrical power demand may comprise delaying a start of one or more of the planned well construction operations.

The operating control system may: (A) determine an electrical power output capacity indicative of electrical power that the power supply system can output to the well construction equipment to perform the planned well construction operations; and display on a video output device for viewing by personnel: (i) the electrical power output capacity; and (ii) the planned electrical power demand of the well construction equipment to perform the planned well construction operations.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

What is claimed is:

1. A well construction system comprising:
    well construction equipment operable to construct, at a wellsite, a well that extends to a reservoir;
    a power supply system operable to output electrical power to the well construction equipment to facilitate operation of the well construction equipment and at least in part operable to generate electrical power using gas produced from the reservoir; and
    a control system configured to control the well construction system, wherein the control system comprises a processor and a memory storing a computer program code, and wherein the control system is operable to:
    store a digital drilling program comprising:
        an equipment operational plan indicative of a sequence of planned well construction operations to be performed by the well construction equipment over a period of time to construct the well, wherein each planned well construction operation in the sequence of planned well construction operations is scheduled to be performed at a respective time within the period of time; and
        an electrical power plan indicative of a planned electrical power demand of the well construction equipment to perform the sequence of planned well construction operations;
    determine an electrical power output capacity indicative of a total electrical power that the power supply system can output to the well construction equipment to perform the sequence of planned well construction operations;
    compare the electrical power output capacity to the planned electrical power demand;
    based on the comparison, adjust the sequence of planned well construction operations to adjust the planned electrical power demand by adjustment of at least one of a speed of, an acceleration of, a pressure generated by, and a flow rate output by a component of the well construction equipment to perform the sequence of planned well construction operations; and
    optimize performance of the power supply system based at least in part on availability of the gas produced from the reservoir; and
    cause the well construction equipment to perform the sequence of planned well construction operations indicated in the equipment operational plan.

2. The well construction system of claim 1 wherein the electrical power plan specifies a respective amount of electrical power at the respective time for each planned well construction operation in the sequence of planned well construction operations, and the control system is further operable to cause the power supply system to output the electrical power to the well construction equipment based on the electrical power plan to thereby meet the planned electrical power demand of the well construction equipment to perform the sequence of planned well construction operations.

3. The well construction system of claim 2 wherein the electrical power output by the power supply system exceeds the planned electrical power demand of the well construction equipment by a predetermined amount.

4. The well construction system of claim 2 wherein the electrical power output by the power supply system also minimizes discharge rate of exhaust emissions.

5. The well construction system of claim 2 wherein the electrical power output by the power supply system also minimizes consumption rate of fuel.

6. The well construction system of claim 2 wherein:
    the power supply system comprises:
        a plurality of electric generator units, wherein one or more of the electric generator units are powerable using the gas produced from the reservoir; and
        an electrical energy storage unit; and
    the control system is further operable to:
        cause the electrical energy storage unit to store at least some of the electrical power output by the plurality of electric generator units; and
        cause the plurality of electric generator units and the electrical energy storage unit to output the electrical power to the well construction equipment based on the electrical power plan to thereby meet the planned electrical power demand of the well construction equipment to perform the sequence of planned well construction operations.

7. The well construction system of claim 1 wherein the control system is further operable to:
    determine an actual electrical power demand of the well construction equipment during the performance of the sequence of planned well construction operations;
    compare the actual electrical power demand to the planned electrical power demand;
    based on the comparison, adjust the planned electrical power demand to form an adjusted planned electrical power demand; and
    cause the power supply system to output the electrical power to the well construction equipment based on the adjusted planned electrical power demand to thereby meet the adjusted planned electrical power demand of the well construction equipment to perform the sequence of planned well construction operations.

8. The well construction system of claim 1 wherein adjusting the sequence of planned well construction operations to adjust the planned electrical power demand comprises delaying a start of one or more of the planned well construction operations in the sequence of planned well construction operations.

9. The well construction system of claim 8, wherein the delaying a start of one or more of the planned well construction operations in the sequence of planned well construction operations provides time for one or more electrical generators to operate at higher efficiency.

10. The well construction system of claim 1 wherein the control system is further operable to:

determine an electrical power output capacity indicative of a total electrical power that the power supply system can output to the well construction equipment to perform the sequence of planned well construction operations; and display on a video output device for viewing by personnel:

the electrical power output capacity; and a graph that represents variations in the planned electrical power demand of the well construction equipment to perform the sequence of planned well construction operations over the period of time.

11. The well construction system of claim 1 wherein the control system is further operable to display on a video output device for viewing by personnel:

a graph comprising a curve that indicates variations in the planned electrical power demand of the well construction equipment to perform the sequence of planned well construction operations over the period of time.

12. The well construction system of claim 11 wherein the control system is further operable to display on the video output device for view by personnel:

the graph comprising an additional curve that indicates an actual electrical power demand of the well construction equipment during the performance of the sequence of planned well construction operations over the period of time.

13. The well construction system of claim 1, wherein the gas produced from the reservoir is at least in part produced via the well.

14. The well construction system of claim 1, wherein the gas produced from the reservoir is at least in part produced during one or more of the planned well construction operations.

15. A method comprising:

storing, via a control system of a well construction system, a digital drilling program comprising:

an equipment operational plan indicative of a sequence of planned well construction operations to be performed by well construction equipment to construct, at a wellsite, a well that extends to a reservoir; and an electrical power plan indicative of a planned electrical power demand of the well construction equipment to perform the sequence of planned well construction operations;

instructing, via the control system, the well construction equipment to perform each planned well construction operation in the sequence of planned well construction operations at a respective time indicated in the equipment operational plan;

determining, using the control system, an electrical power output capacity indicative of a total electrical power that a power supply system can output to the well construction equipment to perform the sequence of planned well construction operations, wherein the power supply system is at least in part operable to generate electrical power using gas produced from the reservoir;

comparing, using the control system, the electrical power output capacity to the planned electrical power demand;

based on the comparing and using the control system, adjusting at least one planned well construction operation in the sequence of planned well construction operations by adjusting at least one of a speed of, an acceleration of, a pressure generated by, and a flow rate output by a component of the well construction equipment to perform the sequence of planned well construction operations; and optimize performance of the power supply system based at least in part on availability of the gas produced from the reservoir.

16. The method of claim 15 wherein adjusting the at least one planned well construction operation to adjust the planned electrical power demand comprises delaying a start of the at least one planned well construction operation.

17. The method of claim 16, wherein the delaying a start of the at least one planned well construction operation provides time for one or more electrical generators to operate at higher efficiency.

18. The method of claim 15 further comprising:

prior to instructing the well construction equipment to perform the sequence of planned well construction operations and using the control system, instructing a video output device to display for viewing by personnel:

a graph comprising a curve that indicates variations in the planned electrical power demand of the well construction equipment to perform the sequence of planned well construction operations over time.

* * * * *